United States Patent
Kawamura et al.

(10) Patent No.: US 10,681,366 B2
(45) Date of Patent: Jun. 9, 2020

(54) VIDEO ENCODING APPARATUS, VIDEO DECODING APPARATUS, VIDEO COMPRESSION AND TRANSMISSION SYSTEM, VIDEO ENCODING METHOD, VIDEO DECODING METHOD, AND COMPUTER READABLE STORAGE MEDIUM

(71) Applicant: KDDI CORPORATION, Tokyo (JP)

(72) Inventors: Kei Kawamura, Fujimino (JP); Sei Naito, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 204 days.

(21) Appl. No.: 15/403,905

(22) Filed: Jan. 11, 2017

(65) Prior Publication Data
US 2017/0127080 A1 May 4, 2017

Related U.S. Application Data

(63) Continuation of application No. PCT/JP2015/069043, filed on Jul. 1, 2015.

(30) Foreign Application Priority Data

Sep. 30, 2014 (JP) .................................. 2014-202509

(51) Int. Cl.
  *H04N 19/50* (2014.01)
  *H04N 19/105* (2014.01)
  (Continued)

(52) U.S. Cl.
  CPC .......... *H04N 19/50* (2014.11); *H04N 19/105* (2014.11); *H04N 19/11* (2014.11); *H04N 19/136* (2014.11);
  (Continued)

(58) Field of Classification Search
  CPC .. H04N 19/176; H04N 19/593; H04N 19/186; H04N 19/11; H04N 19/159;
  (Continued)

(56) References Cited

U.S. PATENT DOCUMENTS

| 2012/0328013 A1 | 12/2012 | Budagavi et al. |
| 2013/0272401 A1* | 10/2013 | Seregin ............... H04N 19/186 |
| | | 375/240.12 |
| 2015/0365684 A1* | 12/2015 | Chen ................... H04N 19/593 |
| | | 375/240.13 |

FOREIGN PATENT DOCUMENTS

| EP | 2 536 151 A2 | 12/2012 |
| GB | 2498982 A | 8/2013 |

(Continued)

OTHER PUBLICATIONS

Kawamura et al.; Intra Reference Prediction by Cross-Component Prediction, Joint Collaborative Team on Video Coding (JCT-VC) of ITU-T SG 16 WP 3 and ISO/IEC JTC 1/SC 29/WG 11 19$^{th}$ Meeting: Strasbourg, FR, JCTVC-S0272, Oct. 16, 2014 pp. 1-3.

(Continued)

*Primary Examiner* — Dave Czekaj
*Assistant Examiner* — Samuel D Fereja
(74) *Attorney, Agent, or Firm* — Fitch, Even, Tabin & Flannery LLP

(57) ABSTRACT

A video encoding apparatus that encodes a video having a plurality of color components includes: a linear prediction unit configured to perform linear prediction of reference pixels of a prediction target color component using reference pixels that are used in intra prediction for a color component other than the prediction target color component among the plurality of color components; and an intra prediction unit configured to perform intra prediction of a prediction target block of the prediction target color component using the reference pixels of the prediction target color component that have been obtained through the linear prediction performed by the linear prediction unit.

14 Claims, 21 Drawing Sheets

(51) Int. Cl.
*H04N 19/176* (2014.01)
*H04N 19/186* (2014.01)
*H04N 19/593* (2014.01)
*H04N 19/11* (2014.01)
*H04N 19/136* (2014.01)
*H04N 19/159* (2014.01)
*H04N 19/82* (2014.01)
*H04N 19/182* (2014.01)

(52) U.S. Cl.
CPC ......... *H04N 19/159* (2014.11); *H04N 19/176* (2014.11); *H04N 19/186* (2014.11); *H04N 19/593* (2014.11); *H04N 19/182* (2014.11); *H04N 19/82* (2014.11)

(58) Field of Classification Search
CPC .... H04N 19/105; H04N 19/117; H04N 19/70; H04N 19/124; H04N 19/103; H04N 19/44; H04N 19/147; H04N 19/82; H04N 19/157; H04N 19/182; H04N 19/61; H04N 19/91; H04N 19/50; H04N 19/597; H04N 19/86; H04N 19/13; H04N 19/59; H04N 19/96; H04N 19/136; H04N 19/46; H04N 19/52; H04N 19/80; H04N 19/107; H04N 19/119; H04N 19/129; H04N 19/14; H04N 19/174; H04N 19/18; H04N 19/463; H04N 19/587; H04N 19/12; H04N 19/132; H04N 19/154; H04N 19/184; H04N 19/109; H04N 19/126; H04N 19/15; H04N 19/167; H04N 19/196; H04N 19/30; H04N 19/33; H04N 19/503; H04N 19/513; H04N 19/60; H04N 19/134; H04N 19/139; H04N 19/172; H04N 19/1883; H04N 19/51; H04N 19/523; H04N 19/573; H04N 19/577; H04N 13/161; H04N 19/00; H04N 19/00587; H04N 19/00769; H04N 19/102; H04N 19/122; H04N 19/137; H04N 19/156; H04N 19/16; H04N 19/187; H04N 19/19; H04N 19/198; H04N 19/39; H04N 19/42; H04N 19/423; H04N 19/436; H04N 19/55; H04N 19/567; H04N 19/57; H04N 19/583; H04N 19/625; H04N 19/649; H04N 21/234363; H04N 21/234381; H04N 21/2383; H04N 9/8045; H04N 19/00569
See application file for complete search history.

(56) References Cited

FOREIGN PATENT DOCUMENTS

| | | |
|---|---|---|
| JP | 2004-007379 A | 1/2004 |
| JP | 2013-034163 A | 2/2013 |
| JP | 2013-535919 A | 9/2013 |
| WO | 2012/018198 A2 | 2/2012 |

OTHER PUBLICATIONS

JCTVC-R1013_V2, Draft high efficiency video coding (HEVC) version 2, combined format range extensions (RExt), scalability (SHVC), and multi-view (MV-HEVC) extensions.

JCTVC-R0072, SCCE5 3.1.2: Extended inter-component prediction (JCTVC-Q0036).

International Search Report dated Aug. 11, 2015 for PCT/JP2015/069043 and English translation of the same. (4 pages).

The extended European search report dated Aug. 10, 2017, issued in corresponding European Patent Application No. 15845627.7. (12 pages).

Zhang et al.; "Chroma Intra Prediction Based on Inter-Channel Correlation for HEVC"; IEE Transactions on Image Processing, vol. 23; Jan. 1, 2014; pp. 274-286.

Lee et al.; "Intra Prediction Method Based on the Linear Relationship between the Channels for YUV 4:2:0 Intra Coding."; IEEE International Conference on Image Processing Nov. 7, 2009; pp. 1037-1040.

* cited by examiner

VIDEO ENCODING APPARATUS, VIDEO DECODING APPARATUS, VIDEO COMPRESSION AND TRANSMISSION SYSTEM, VIDEO ENCODING METHOD, VIDEO DECODING METHOD, AND COMPUTER READABLE STORAGE MEDIUM

CROSS-REFERENCE TO RELATED APPLICATIONS

This application is a continuation of International Patent Application No. PCT/JP2015/069043 filed on Jul. 1, 2015, and claims priority to Japanese Patent Application No. 2014-202509 filed on Sep. 30, 2014, the entire content of both of which is incorporated herein by reference.

BACKGROUND OF THE INVENTION

Field of the Invention

The present invention relates to a video encoding apparatus, a video decoding apparatus, a video compression/transmission system, a video encoding method, a video decoding method, and a storage medium.

Description of the Related Art

A video encoding method that uses intra prediction (intra-frame prediction) or inter prediction (inter-frame prediction), together with residual transform, has been suggested (see, for example, NPL 1).

First, a description will be given of a video encoding apparatus according to a conventional example corresponding to the foregoing video encoding method. First, the video encoding apparatus according to the conventional example divides an input image into a plurality of blocks. Next, a quantized coefficient level is generated by transforming and quantizing an error (residual) signal obtained from the input image and an intra- or inter-predicted image in units of divided blocks. Then, a bitstream is generated through entropy encoding of the generated quantized coefficient level together with side information (relevant information—e.g., a prediction mode and a motion vector—necessary for reconstruction of pixel values).

On the other hand, a video decoding apparatus according to the conventional example corresponding to the aforementioned video encoding method obtains an output image from a bitstream through a procedure that is the reverse of the procedure performed in the aforementioned video encoding apparatus according to the conventional example. Specifically, a residual signal is generated by inversely quantizing and inversely transforming a quantized coefficient level obtained from the bitstream, and an unfiltered local-decoded image is generated by combining the generated residual signal and an intra- or inter-predicted image. This unfiltered local-decoded image is used in intra prediction. Furthermore, filtered local-decoded images are generated by applying in-loop filtering (e.g., deblocking filtering) to unfiltered local-decoded images, and accumulated in a frame buffer. These filtered local-decoded images are used in inter prediction. Note that processing for obtaining side information and a quantized coefficient level from a bitstream is called parse processing, and reconstruction of pixel values using these side information and quantized coefficient level is called decoding processing.

A description is now given of intra prediction according to the conventional example performed by the aforementioned video encoding apparatus and video decoding apparatus according to the conventional example. In intra prediction according to the conventional example, intra reference pixels and intra-predicted pixels are generated for luminance and chrominance.

In generating intra reference pixels for luminance, first, luminance local-decoded pixels of a block i that was decoded before a target block m (note, i<m), which are output from a local decode buffer, are received as input, reference possibility verification is performed to confirm the decoded state of pixels corresponding to reference pixel positions, and when reference is impossible, padding processing for generating reference pixels by way of copy from other positions is executed. Then, smoothing processing is applied to the reference pixels using a 3-tap filter, and luminance intra reference pixels are output. For chrominance also, similarly to luminance, chrominance intra reference pixels are generated and output.

In generating intra-predicted pixels for luminance, for example, horizontal, vertical, DC, planar, or directional prediction is performed in accordance with an unspecified prediction mode, and luminance intra-predicted pixels are output. For chrominance also, similarly to luminance, chrominance intra-predicted pixels are generated and output.

Note that when parse processing has not been completed, decoding processing for luminance and decoding processing for chrominance can be executed independently.

Regarding HEVC Version 2, there have been studies on Format Range Extensions for supporting more color formats, such as YUV 4:2:2, YUV 4:4:4, and RGB 4:4:4. Methods for improving encoding efficiency of a 4:4:4 color format have also been studied because, as with U/V and B/R, the number of pixels of a chrominance component for a 4:4:4 color format is four times larger than that for a 4:2:0 color format.

On the other hand, regarding HEVC Version 3, there have been studies on encoding and decoding methods dedicated to screen contents other than images captured by cameras, such as PC screens and computer graphics (see, for example, NPL 2). NPL 2 describes luminance/chrominance prediction in which encoding efficiency is improved because linear prediction of a chrominance signal is performed using a luminance reconstruction signal as a reference signal. In this luminance/chrominance prediction, a reconstruction signal for a luminance signal and a local-decoded signal for a chrominance signal are received as input, and a chrominance predicted signal is output by performing linear prediction, which is one of intra prediction modes.

The foregoing linear prediction is realized by the following mathematical expression (1).

[Math. 1]

$$\text{Pred}_c[x,y] = \alpha \times \text{Rec}_L[x,y] + \beta \qquad (1)$$

Note that in mathematical expression (1), $\text{Pred}_c$ denotes a predicted signal of a chrominance block, $\text{Rec}_L$ denotes a reconstruction signal of a luminance block, and $\alpha$ and $\beta$ denote prediction coefficients. Provided that M(X) is defined as an average vector X and R(A,B) is defined as shown in the following mathematical expression (2), the prediction coefficients $\alpha$ and $\beta$ can be calculated using the following mathematical expressions (3) and (4), respectively.

[Math. 2]

$$R(A, B) = M((A - M(A)) \times (B - M(B))) \quad (2)$$

[Math. 3]

$$\alpha = \frac{R(P_L, P_C)}{R(P_L, P_L)} \quad (3)$$

[Math. 4]

$$\beta = M(P_c) - \alpha \times M(P_R) \quad (4)$$

CITATION LIST

Non-Patent Literature

NPL 1: JCTVC-R1013_v2, Draft high efficiency video coding (HEVC) version 2, combined format range extensions (RExt), scalability (SHVC), and multi-view (MV-HEVC) extensions.
NPL 2: JCTVC-R0072, SCCE5 3.1.2: Extended inter-component prediction (JCTVC-Q0036).

SUMMARY OF THE INVENTION

FIG. 21 shows reference pixels that are necessary for performing luminance/chrominance prediction based on the aforementioned linear prediction according to the conventional example. A chrominance signal requires intra-predicted reference pixels P5 that are adjacently to the left of a prediction target block P0, intra-predicted reference pixels P6 that are adjacently to the left of and above the prediction target block P0, and intra-predicted reference pixels P7 that are adjacently above the prediction target block P0. On the other hand, a luminance signal requires a reference block P1 that corresponds to the prediction target block and that is used in luminance/chrominance prediction for the luminance signal, intra-predicted reference pixels P2 that are adjacently to the left of the reference block P1, intra-predicted reference pixels P3 that are adjacently to the left of and above the reference block P1, and intra-predicted reference pixels P4 that are adjacently above the reference block P1.

Therefore, in luminance/chrominance prediction based on the aforementioned linear prediction according to the conventional example, the reference block P1 of the luminance signal is necessary for predicting the prediction target block P0 of the chrominance signal. For this reason, prediction of a chrominance block m requires local decoding (reconstruction) of a luminance block m to be completed; this gives rise to the problem that the degree of freedom in hardware installation is lowered due to the restraints of processing timings.

The present invention has been made in view of the above problem, and aims to reduce the restraints of processing timings in intra prediction based on linear prediction.

DESCRIPTION OF THE EMBODIMENTS

The following describes embodiments of the present invention with reference to the drawings. Note that constituent elements of the following embodiments can be replaced with, for example, their existing counterparts as appropriate, and numerous variations thereof are possible, including combinations with other existing constituent elements. Therefore, the following description of the embodiments is not intended to limit the content of the invention described in the claims.

First Embodiment

Figure 1:
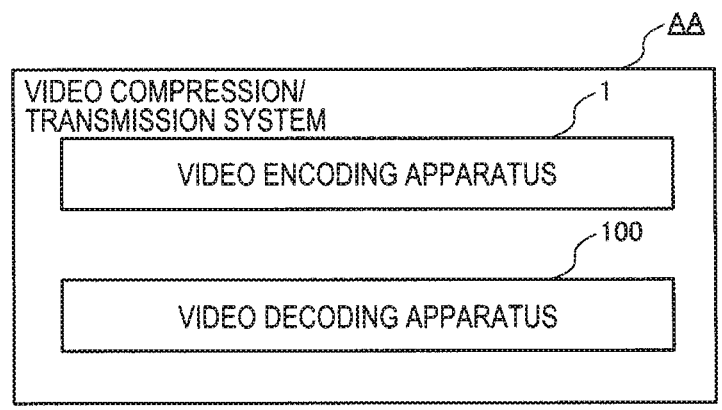
FIG. 1 is a block diagram of a video compression/transmission system according to a first embodiment of the present invention.

FIG. 1 is a block diagram of a video compression/transmission system AA according to a first embodiment of the present invention. The video compression/transmission system AA includes a video encoding apparatus 1 that generates encoded data (see a bitstream SIG2 in FIGS. 2 and 4) by encoding a video, and a video decoding apparatus 100 that decodes the encoded data generated by the video encoding apparatus 1. These video encoding apparatus 1 and video decoding apparatus 100 transmit the foregoing encoded data via, for example, a transmission channel.

[Configuration and Operations of Video Encoding Apparatus 1]

Figure 2:
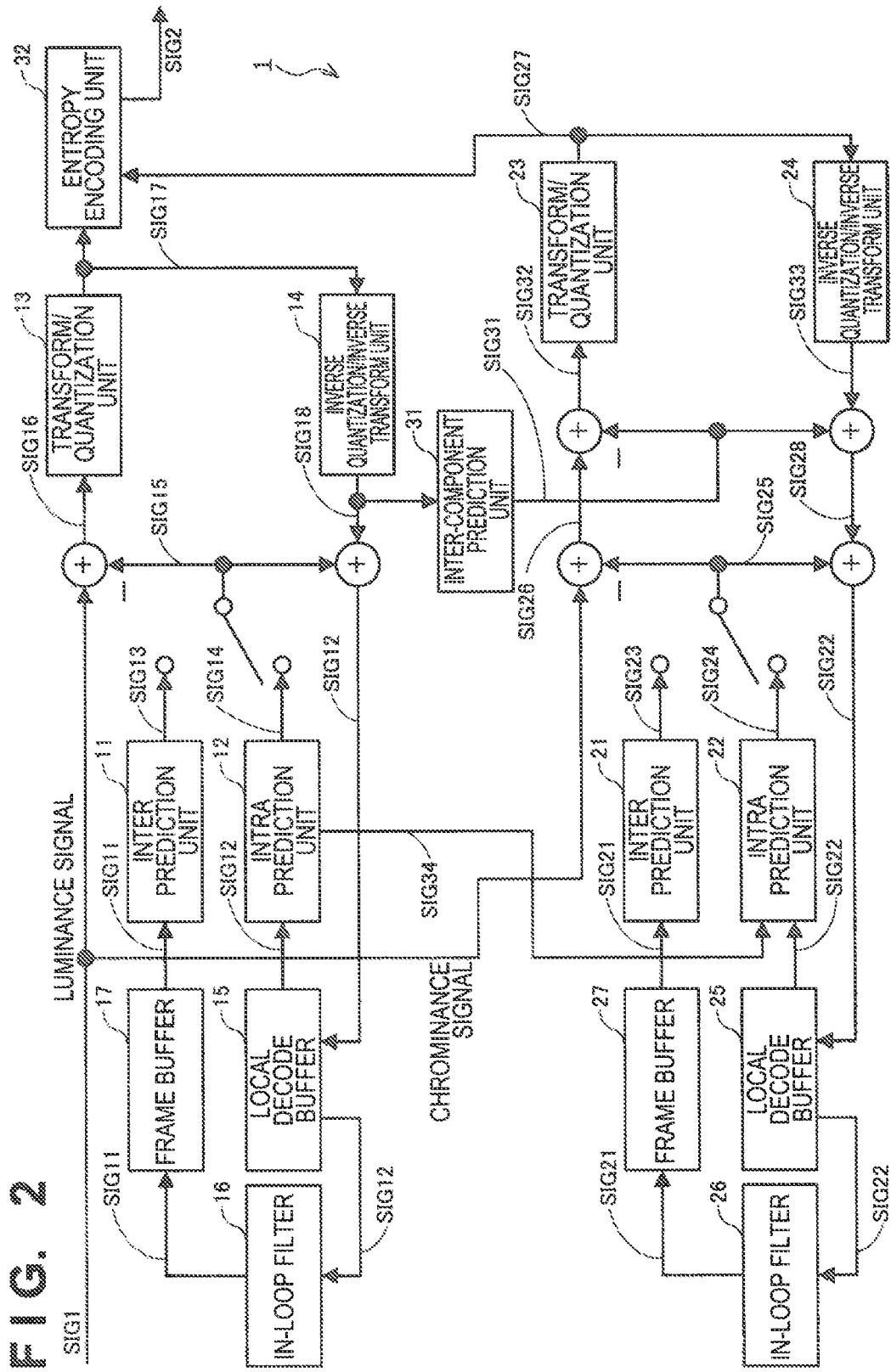
FIG. 2 is a block diagram of a video encoding apparatus according to the first embodiment of the present invention.

FIG. 2 is a block diagram of the video encoding apparatus 1. The video encoding apparatus 1 includes inter prediction units 11, 21, intra prediction units 12, 22, transform/quantization units 13, 23, inverse quantization/inverse transform units 14, 24, local decode buffers 15, 25, in-loop filters 16, 26, frame buffers 17, 27, an inter-component prediction unit 31, and an entropy encoding unit 32.

(Processing for Luminance Signal)

The inter prediction unit 11 receives, as input, a later-described filtered luminance local-decoded image SIG11 fed from the frame buffer 17. The inter prediction unit 11 generates luminance inter-predicted pixels SIG13 by performing inter prediction using the filtered luminance local-decoded image SIG11, and outputs the generated pixels.

The intra prediction unit 12 receives, as input, a later-described unfiltered luminance local-decoded image SIG12 fed from the local decode buffer 15. The intra prediction unit 12 generates luminance intra-predicted pixels SIG 14 by performing intra prediction using the unfiltered luminance local-decoded image SIG 12, and outputs the generated pixels. The intra prediction unit 12 also generates and outputs luminance intra reference pixels SIG34. The intra prediction unit 12 will be described later in detail using FIG. 3.

The transform/quantization unit 13 receives a luminance residual signal SIG16 as input. The transform/quantization unit 13 generates a luminance quantized coefficient SIG17 by transforming and quantizing the luminance residual signal SIG16, and outputs the generated coefficient. Note that the luminance residual signal SIG16 indicates an error (residual) between a luminance signal of an input image SIG 1 and luminance predicted pixels SIG15, and the luminance predicted pixels SIG15 are the luminance inter-predicted pixels SIG13 or the luminance intra-predicted pixels SIG14.

The inverse quantization/inverse transform unit 14 receives the luminance quantized coefficient SIG17 as input. The inverse quantization/inverse transform unit 14 generates an inversely-transformed luminance residual signal SIG18 by inversely quantizing and inversely transforming the luminance quantized coefficient SIG17, and outputs the generated signal.

The local decode buffer 15 accumulates unfiltered luminance local-decoded images SIG12, and feeds them to the intra prediction unit 12 and the in-loop filter 16 as appropriate. Note that an unfiltered luminance local-decoded image SIG12 is a signal obtained by combining luminance predicted pixels SIG15 and an inversely-transformed luminance residual signal SIG18.

The in-loop filter 16 receives the unfiltered luminance local-decoded image SIG12 as input. The in-loop filter 16 generates the filtered luminance local-decoded image SIG11 by applying in-loop filtering, such as deblocking filtering, to the unfiltered luminance local-decoded image SIG12, and outputs the generated image.

The frame buffer 17 accumulates filtered luminance local-decoded images SIG11, and feeds them to the inter prediction unit 11 as appropriate.

(Processing for Chrominance Signal)

The inter prediction unit 21 receives, as input, a later-described filtered chrominance local-decoded image SIG21 fed from the frame buffer 27. The inter prediction unit 21 generates chrominance inter-predicted pixels SIG23 by performing inter prediction using the filtered chrominance local-decoded image SIG21, and outputs the generated pixels.

The intra prediction unit 22 receives, as input, a later-described unfiltered chrominance local-decoded image SIG22 fed from the local decode buffer 25, and the aforementioned luminance intra reference pixels SIG34 fed from the intra prediction unit 12. The intra prediction unit 22 generates chrominance intra-predicted pixels SIG24 by performing intra prediction using the unfiltered chrominance local-decoded image SIG22 and the luminance intra reference pixels SIG34, and outputs the generated pixels. The intra prediction unit 22 will be described later in detail using FIG. 3.

The transform/quantization unit 23 receives a chrominance residual signal SIG32 as input. The transform/quantization unit 23 generates a chrominance quantized coefficient SIG27 by transforming and quantizing the chrominance residual signal SIG32, and outputs the generated coefficient. Note that the chrominance residual signal SIG32 indicates an error (residual) between a chrominance residual signal SIG26 and a later-described chrominance residual correction signal SIG31 fed from the inter-component prediction unit 31. The chrominance residual signal SIG26 indicates an error (residual) between a chrominance signal of the input image SIG1 and chrominance predicted pixels SIG25, and the chrominance predicted pixels SIG25 are the chrominance inter-predicted pixels SIG23 or the chrominance intra-predicted pixels SIG24.

The inverse quantization/inverse transform unit 24 receives the chrominance quantized coefficient SIG27 as input. The inverse quantization/inverse transform unit 24 generates an inversely-transformed chrominance residual signal SIG33 by inversely quantizing and inversely transforming the chrominance quantized coefficient SIG27, and outputs the generated signal.

The local decode buffer 25 accumulates unfiltered chrominance local-decoded images SIG22, and feeds them to the intra prediction unit 22 and the in-loop filter 26 as appropriate. Note that an unfiltered chrominance local-decoded image SIG22 is a signal obtained by combining chrominance predicted pixels SIG25 and a chrominance residual signal SIG28, and the chrominance residual signal SIG28 is obtained by combining a chrominance residual correction signal SIG31 and an inversely-transformed chrominance residual signal SIG33. The unfiltered chrominance local-decoded image SIG22 can be calculated using the following mathematical expression (5).

[Math. 5]

$$\begin{aligned} SIG22 &= Pred_c[x, y] + SIG33 \\ &= \alpha \times Rec_L[x, y] + \beta + SIG33 \\ &= \alpha \times (Pred_L[x, y] + Res_L[x, y]) + \beta + SIG33 \\ &= \alpha \times IntraPred(P_L) + \beta + \alpha \times Res_L[x, y] + SIG33 \\ &= IntraPred(\alpha \times P_L + \beta) + CCP + SIG33 \\ &= SIG25 + SIG31 + SIG28 \\ &= SIG25 + SIG28 \end{aligned} \qquad (5)$$

The in-loop filter 26 receives the unfiltered chrominance local-decoded image SIG22 as input. The in-loop filter 26 generates the filtered chrominance local-decoded image SIG21 by applying in-loop filtering, such as deblocking filtering, to the unfiltered chrominance local-decoded image SIG22, and outputs the generated image.

The frame buffer 27 accumulates filtered chrominance local-decoded images SIG21, and feeds them to the inter prediction unit 21 as appropriate.

The inter-component prediction unit 31 receives, as input, the inversely-transformed luminance residual signal SIG18 and a prediction coefficient (not shown) that serves as side information. The inter-component prediction unit 31 generates the chrominance residual correction signal SIG31 using the following mathematical expression (6), and outputs the generated signal.

[Math. 6]

$$SIG31 = CCP$$
$$= \alpha \times Res_L[x, y]$$
$$= (SIG18 \times ResScaleVal) \gg 3 \quad (6)$$

Note that in mathematical expression (6), ResScaleVal denotes the prediction coefficient input to the inter-component prediction unit 31.

The entropy encoding unit 32 receives the luminance quantized coefficient SIG17, the chrominance quantized coefficient SIG27, and non-illustrated side information as input. The entropy encoding unit 32 applies entropy encoding to input signals, and outputs the result of entropy encoding as the bitstream SIG2.

Figure 3:
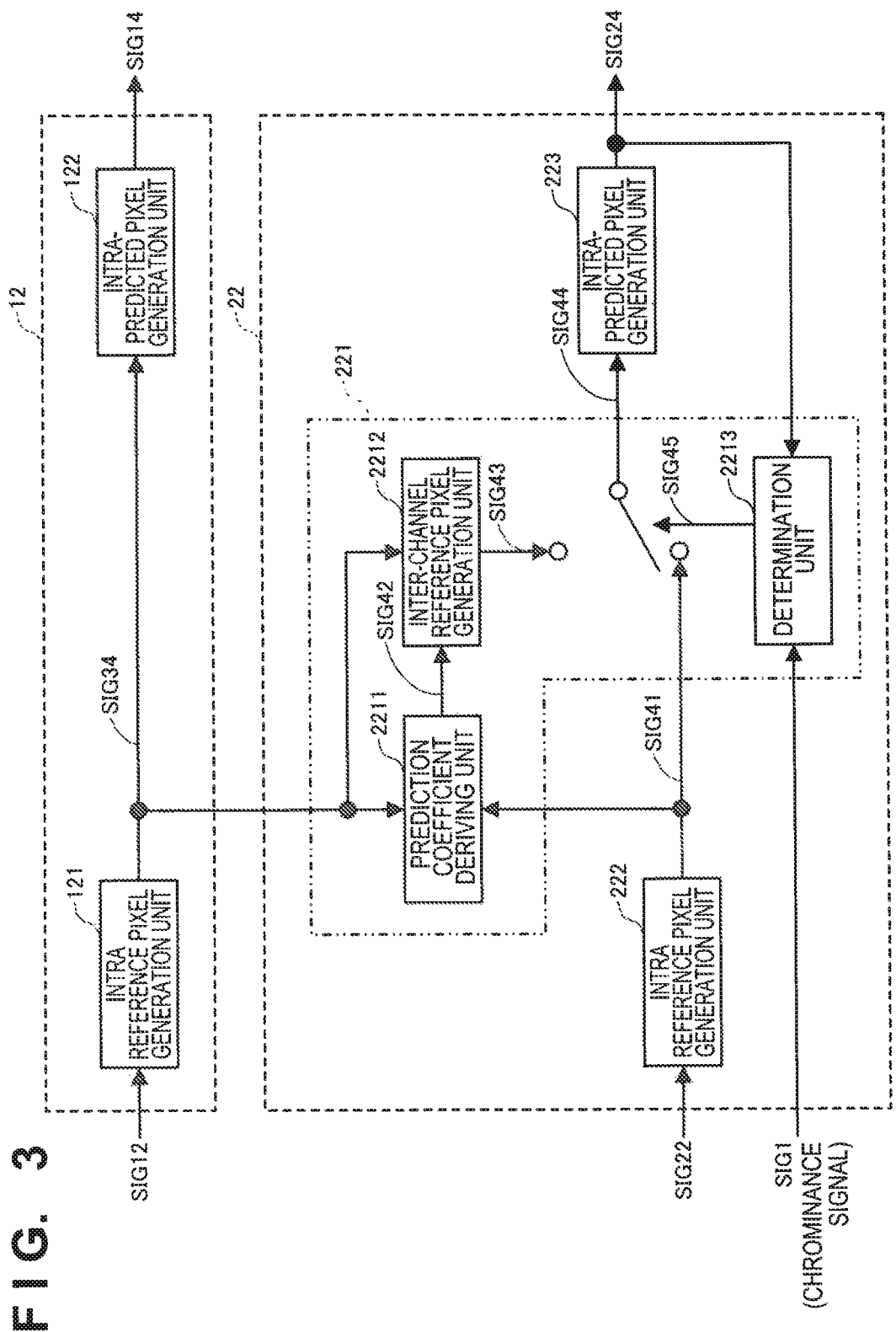
FIG. 3 is a block diagram of intra prediction units according to the first embodiment of the present invention.

FIG. 3 is a block diagram of the intra prediction units 12, 22. The intra prediction unit 12 includes an intra reference pixel generation unit 121 and an intra-predicted pixel generation unit 122.

The intra reference pixel generation unit 121 receives, as input, an unfiltered luminance local-decoded image SIG12 of a block i that was decoded before a target block m (note, i<m). The intra reference pixel generation unit 121 first performs reference possibility verification to confirm the local-decoded state of pixels corresponding to reference pixel positions, and when reference is impossible, executes padding processing for generating reference pixels by way of copy from other positions. Then, it applies smoothing processing to the reference pixels using a 3-tap filter, and outputs luminance intra reference pixels SIG34 of the block i.

The intra-predicted pixel generation unit 122 receives the luminance intra reference pixels SIG34 as input. The intra-predicted pixel generation unit 122 generates luminance intra-predicted pixels SIG14 by performing, for example, horizontal, vertical, DC, planar, or directional prediction in accordance with a prediction mode using the luminance intra reference pixels SIG34, and outputs the generated pixels.

The intra prediction unit 22 includes an inter-channel prediction unit 221, an intra reference pixel generation unit 222, and an intra-predicted pixel generation unit 223. The inter-channel prediction unit 221 includes a prediction coefficient deriving unit 2211, an inter-channel reference pixel generation unit 2212, and a determination unit 2213.

The intra reference pixel generation unit 222 receives, as input, an unfiltered chrominance local-decoded image SIG22 of a block j that was decoded before a target block n (note, j≤n≤m). The intra reference pixel generation unit 222 first performs reference possibility verification to confirm the local-decoded state of pixels corresponding to reference pixel positions, and when reference is impossible, executes padding processing for generating reference pixels by way of copy from other positions. Then, it applies smoothing processing to the reference pixels using a 3-tap filter, and outputs chrominance intra reference pixels SIG41 of the block j.

The intra-predicted pixel generation unit 223 receives chrominance intra reference pixels SIG44 as input. The intra-predicted pixel generation unit 223 generates chrominance intra-predicted pixels SIG24 by performing, for example, horizontal, vertical, DC, planar, or directional prediction in accordance with a prediction mode using the chrominance intra reference pixels SIG44, and outputs the generated pixels. Note that the chrominance intra reference pixels SIG44 are one of the chrominance intra reference pixels SIG41 and later-described chrominance intra-predicted reference pixels SIG43 fed from the inter-channel reference pixel generation unit 2212.

The prediction coefficient deriving unit 2211 receives the luminance intra reference pixels SIG34 of the block i and the chrominance intra reference pixels SIG41 of the block j as input. The prediction coefficient deriving unit 2211 derives a prediction coefficient SIG42 using the luminance intra reference pixels SIG34 of the block i and the chrominance intra reference pixels SIG41 of the block j in accordance with, for example, a least squares method or a method described in NPL 2, and outputs the derived coefficient.

The inter-channel reference pixel generation unit 2212 receives the luminance intra reference pixels SIG34 of the block i and the prediction coefficient SIG42 as input. The inter-channel reference pixel generation unit 2212 generates the chrominance intra-predicted reference pixels SIG43 using the following mathematical expression (7), and outputs the generated pixels.

[Math. 7]

$$SIG43 = \alpha \times P_L + \beta$$

$$\alpha \times SIG34 + \beta \quad (7)$$

Note that $\alpha$ and $\beta$ in mathematical expression (7) can be obtained from the prediction coefficient SIG42.

The determination unit 2213 receives the chrominance signal of the input image SIG1 and the chrominance intra-predicted pixels SIG24 as input. The determination unit 2213 generates a control signal SIG45 based on the chrominance signal of the input image SIG1 and the chrominance intra-predicted pixels SIG24 so as to select the chrominance intra reference pixels SIG41 or the chrominance intra-predicted reference pixels SIG43 as the chrominance intra reference pixels SIG44 to be fed to the intra-predicted pixel generation unit 223.

[Configuration and Operations of Video Decoding Apparatus 100]

Figure 4:
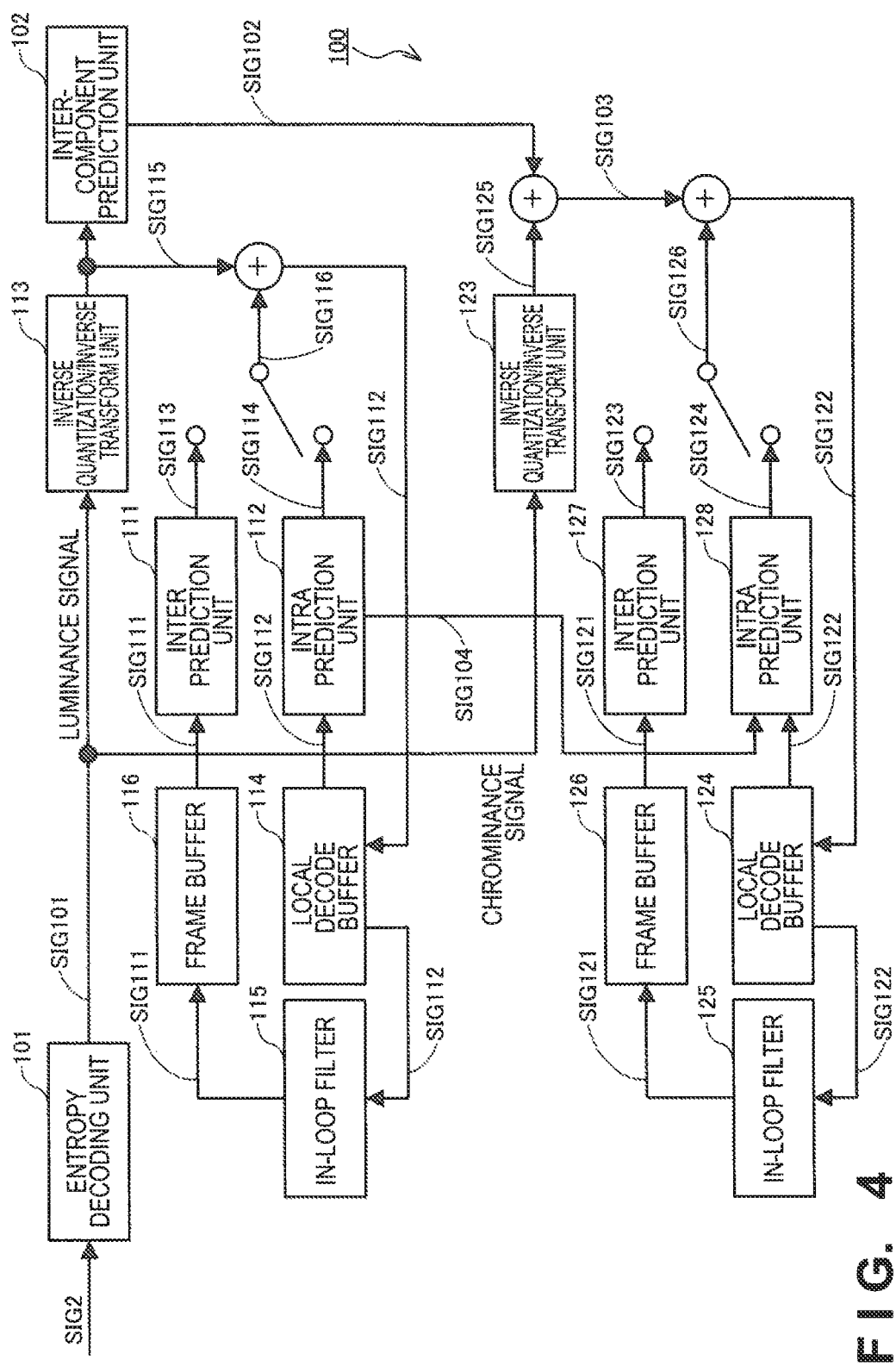
FIG. 4 is a block diagram of a video decoding apparatus according to the first embodiment of the present invention.

FIG. 4 is a block diagram of the video decoding apparatus 100. The video decoding apparatus 100 includes an entropy decoding unit 101, an inter-component prediction unit 102, inter prediction units 111, 127, intra prediction units 112, 128, inverse quantization/inverse transform units 113, 123, local decode buffers 114, 124, in-loop filters 115, 125, and frame buffers 116, 126.

The entropy decoding unit 101 receives the bitstream SIG2 as input. The entropy decoding unit 101 derives a quantized coefficient level SIG101, as well as relevant information (side information)—e.g., a prediction mode and a motion vector—necessary for reconstructing pixel values, by applying entropy decoding to the bitstream SIG2, and outputs the derived quantized coefficient level and relevant information.

(Processing for Luminance Signal)

The inter prediction unit 11 receives, as input, a later-described filtered luminance local-decoded image SIG111 fed from the frame buffer 116. The inter prediction unit 111 generates luminance inter-predicted pixels SIG113 by performing inter prediction using the filtered luminance local-decoded image SIG111, and outputs the generated pixels.

The intra prediction unit 112 receives, as input, a later-described unfiltered luminance local-decoded image SIG112 fed from the local decode buffer 114. The intra prediction unit 112 generates luminance intra-predicted pixels SIG114 by performing intra prediction using the unfiltered luminance local-decoded image SIG112, and outputs the generated pixels. The intra prediction unit 112 also generates and outputs luminance intra reference pixels SIG104. The intra prediction unit 112 will be described later in detail using FIG. 5.

The inverse quantization/inverse transform unit 113 receives a luminance signal of the quantized coefficient level SIG101 as input. The inverse quantization/inverse transform unit 113 generates an inversely-transformed luminance residual signal SIG115 by inversely quantizing and inversely transforming the luminance signal of the quantized coefficient level SIG101, and outputs the generated signal.

The local decode buffer 114 accumulates unfiltered luminance local-decoded images SIG112, and feeds them to the intra prediction unit 112 and the in-loop filter 115 as appropriate. Note that an unfiltered luminance local-decoded image SIG112 is a signal obtained by combining luminance predicted pixels SIG116 and an inversely-transformed luminance residual signal SIG115, and the luminance predicted pixels SIG116 are the luminance inter-predicted pixels SIG113 or the luminance intra-predicted pixels SIG114.

The in-loop filter 115 receives the unfiltered luminance local-decoded image SIG112 as input. The in-loop filter 115 generates the filtered luminance local-decoded image SIG111 by applying in-loop filtering, such as deblocking filtering, to the unfiltered luminance local-decoded image SIG112, and outputs the generated image.

The frame buffer 116 accumulates filtered luminance local-decoded images SIG111, and feeds them to the inter prediction unit 111 as appropriate.

The inter-component prediction unit 102 receives, as input, the inversely-transformed luminance residual signal SIG115 and a prediction coefficient (not shown) that serves as side information. The inter-component prediction unit 102 generates a chrominance residual correction signal SIG102 using the following mathematical expression (8), and outputs the generated signal.

[Math. 8]

$$SIG102 = CCP \qquad (8)$$
$$= \alpha \times Res_L[x, y]$$
$$= (SIG115 \times ResScaleVal) \gg 3$$

Note that in mathematical expression (8), ResScaleVal denotes the prediction coefficient input to the inter-component prediction unit 102.

(Processing for Chrominance Signal)

The inter prediction unit 127 receives, as input, a later-described filtered chrominance local-decoded image SIG121 fed from the frame buffer 126. The inter prediction unit 127 generates chrominance inter-predicted pixels SIG123 by performing inter prediction using the filtered chrominance local-decoded image SIG121, and outputs the generated pixels.

The intra prediction unit 128 receives, as input, a later-described unfiltered chrominance local-decoded image SIG122 fed from the local decode buffer 124, and the aforementioned luminance intra reference pixels SIG104 fed from the intra prediction unit 112. The intra prediction unit 128 generates chrominance intra-predicted pixels SIG124 by performing intra prediction using the unfiltered chrominance local-decoded image SIG122 and the luminance intra reference pixels SIG104, and outputs the generated pixels. The intra prediction unit 128 will be described later in detail using FIG. 5.

The inverse quantization/inverse transform unit 123 receives a chrominance signal of the quantized coefficient level SIG101 as input. The inverse quantization/inverse transform unit 123 generates an inversely-transformed chrominance residual signal SIG125 by inversely quantizing and inversely transforming the chrominance signal of the quantized coefficient level SIG101, and outputs the generated signal.

The local decode buffer 124 accumulates unfiltered chrominance local-decoded images SIG122, and feeds them to the intra prediction unit 128 and the in-loop filter 125 as appropriate. Note that an unfiltered chrominance local-decoded image SIG122 is a signal obtained by combining chrominance predicted pixels SIG126 and a chrominance residual signal SIG103, and the chrominance residual signal SIG103 is obtained by combining an inversely-transformed chrominance residual signal SIG125 and a chrominance residual correction signal SIG102. The unfiltered chrominance local-decoded image SIG122 can be calculated using the following mathematical expression (9). The chrominance predicted pixels SIG126 are the chrominance inter-predicted pixels SIG123 or the chrominance intra-predicted pixels SIG124.

[Math. 9]

$$\begin{aligned}SIG122 &= Pred_C[x, y] + SIG125 \qquad (9)\\
&= \alpha \times Rec_L[x, y] + \beta + SIG125\\
&= \alpha \times (Pred_L[x, y] + Res_L[x, y]) + \beta + SIG125\\
&= \alpha \times IntraPred(P_L) + \beta + \alpha \times Res_L[x, y] + SIG125\\
&= IntraPred(\alpha \times P_L + \beta) + CCP + SIG125\\
&= SIG126 + SIG102 + SIG125\\
&= SIG126 + SIG103\end{aligned}$$

The in-loop filter 125 receives the unfiltered chrominance local-decoded image SIG122 as input. The in-loop filter 125 generates the filtered chrominance local-decoded image SIG121 by applying in-loop filtering, such as deblocking filtering, to the unfiltered chrominance local-decoded image SIG122, and outputs the generated image.

The frame buffer 126 accumulates filtered chrominance local-decoded images SIG121, and feeds them to the inter prediction unit 127 as appropriate.

Figure 5:
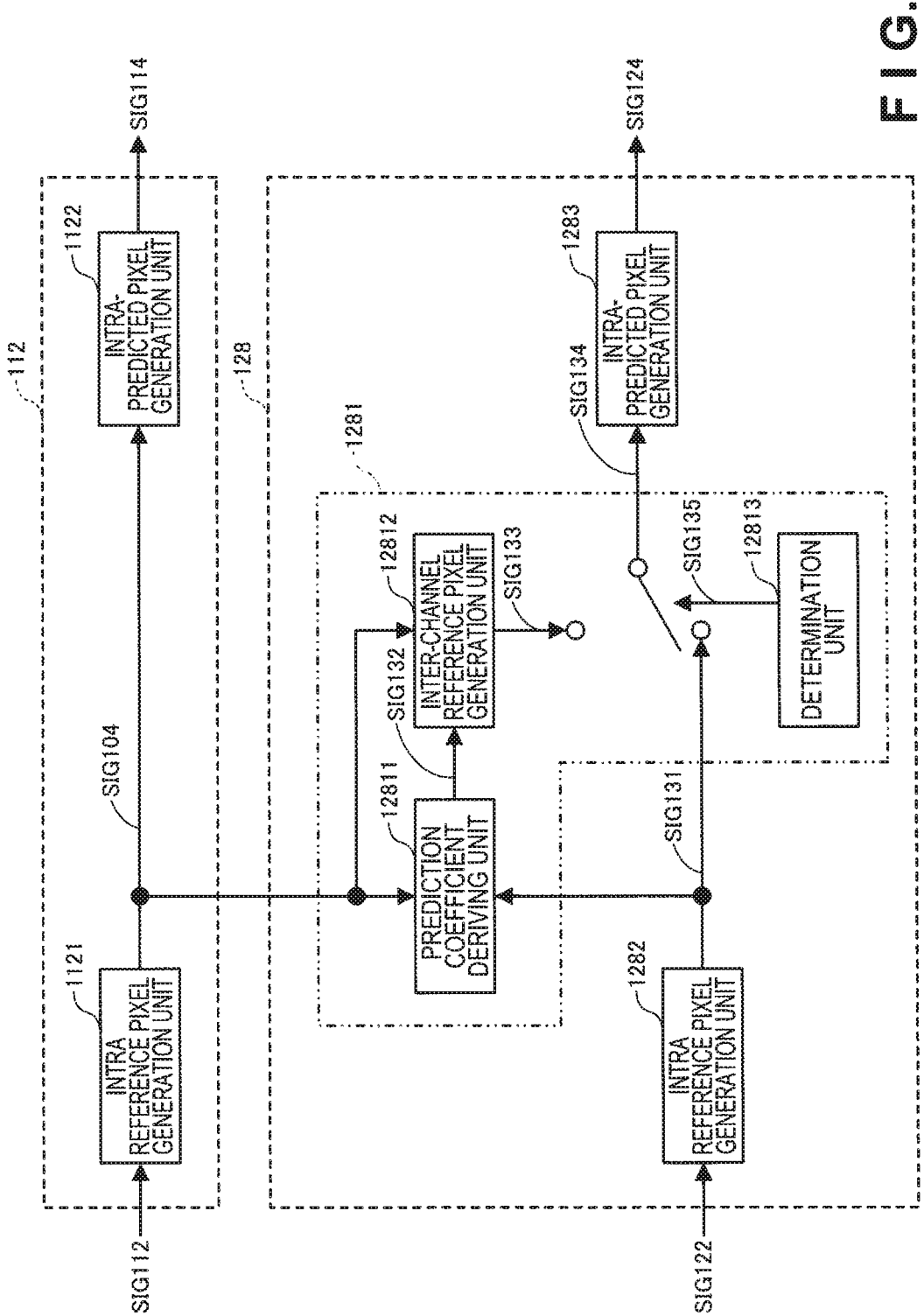
FIG. 5 is a block diagram of intra prediction units according to the first embodiment of the present invention.

FIG. 5 is a block diagram of the intra prediction units 112, 128. The intra prediction unit 112 includes an intra reference pixel generation unit 1121 and an intra-predicted pixel generation unit 1122.

The intra reference pixel generation unit 1121 receives, as input, an unfiltered luminance local-decoded image SIG112 of a block i that was decoded before a target block m (note, i<m). The intra reference pixel generation unit 1121 first performs reference possibility verification to confirm the local-decoded state of pixels corresponding to reference pixel positions, and when reference is impossible, executes padding processing for generating reference pixels by way of copy from other positions. Then, it applies smoothing processing to the reference pixels using a 3-tap filter, and outputs luminance intra reference pixels SIG104 of the block i.

The intra-predicted pixel generation unit 1122 receives the luminance intra reference pixels SIG104 as input. The intra-predicted pixel generation unit 1122 generates luminance intra-predicted pixels SIG114 by performing, for example, horizontal, vertical, DC, planar, or directional prediction in accordance with a prediction mode using the luminance intra reference pixels SIG104, and outputs the generated pixels.

The intra prediction unit 128 includes an inter-channel prediction unit 1281, an intra reference pixel generation unit 1282, and an intra-predicted pixel generation unit 1283. The inter-channel prediction unit 1281 includes a prediction coefficient deriving unit 12811, an inter-channel reference pixel generation unit 12812, and a determination unit 12813.

The intra reference pixel generation unit 1282 receives, as input, an unfiltered chrominance local-decoded image SIG122 of a block j that was decoded before a target block n (note, j≤n≤m). The intra reference pixel generation unit 1282 first performs reference possibility verification to confirm the local-decoded state of pixels corresponding to reference pixel positions, and when reference is impossible, executes padding processing for generating reference pixels by way of copy from other positions. Then, it applies smoothing processing to the reference pixels using a 3-tap filter, and outputs chrominance intra reference pixels SIG131 of the block j.

The intra-predicted pixel generation unit 1283 receives chrominance intra reference pixels SIG134 as input. The intra-predicted pixel generation unit 1283 generates chrominance intra-predicted pixels SIG124 by performing, for example, horizontal, vertical, DC, planar, or directional prediction in accordance with a prediction mode using the chrominance intra reference pixels SIG134, and outputs the generated pixels. Note that the chrominance intra reference pixels SIG134 are one of the chrominance intra reference pixels SIG131 and later-described chrominance intra-predicted reference pixels SIG133 fed from the inter-channel reference pixel generation unit 12812.

The prediction coefficient deriving unit 12811 receives the luminance intra reference pixels SIG104 of the block i and the chrominance intra reference pixels SIG131 of the block j as input. The prediction coefficient deriving unit 12811 derives a prediction coefficient SIG132 using the luminance intra reference pixels SIG104 of the block i and the chrominance intra reference pixels SIG131 of the block j in accordance with, for example, a least squares method or a method described in NPL 2, and outputs the derived coefficient.

The inter-channel reference pixel generation unit 12812 receives the luminance intra reference pixels SIG104 of the block i and the prediction coefficient SIG132 as input. The inter-channel reference pixel generation unit 12812 generates the chrominance intra-predicted reference pixels SIG133 by performing linear prediction using the following mathematical expression (10), and outputs the generated pixels.

[Math. 10]

$$SIG133 = \alpha \times P_L + \beta \qquad (10)$$
$$= \alpha \times SIG104 + \beta$$

Note that $\alpha$ and $\beta$ in mathematical expression (10) can be obtained from the prediction coefficient SIG132.

The determination unit 12813 receives, as input, a non-illustrated signal determined on the encoding side. The determination unit 12813 generates a control signal SIG135 based on this signal so as to select the chrominance intra reference pixels SIG131 or the chrominance intra-predicted reference pixels SIG133 as the chrominance intra reference pixels SIG134 to be fed to the intra-predicted pixel generation unit 1283.

Figure 6:
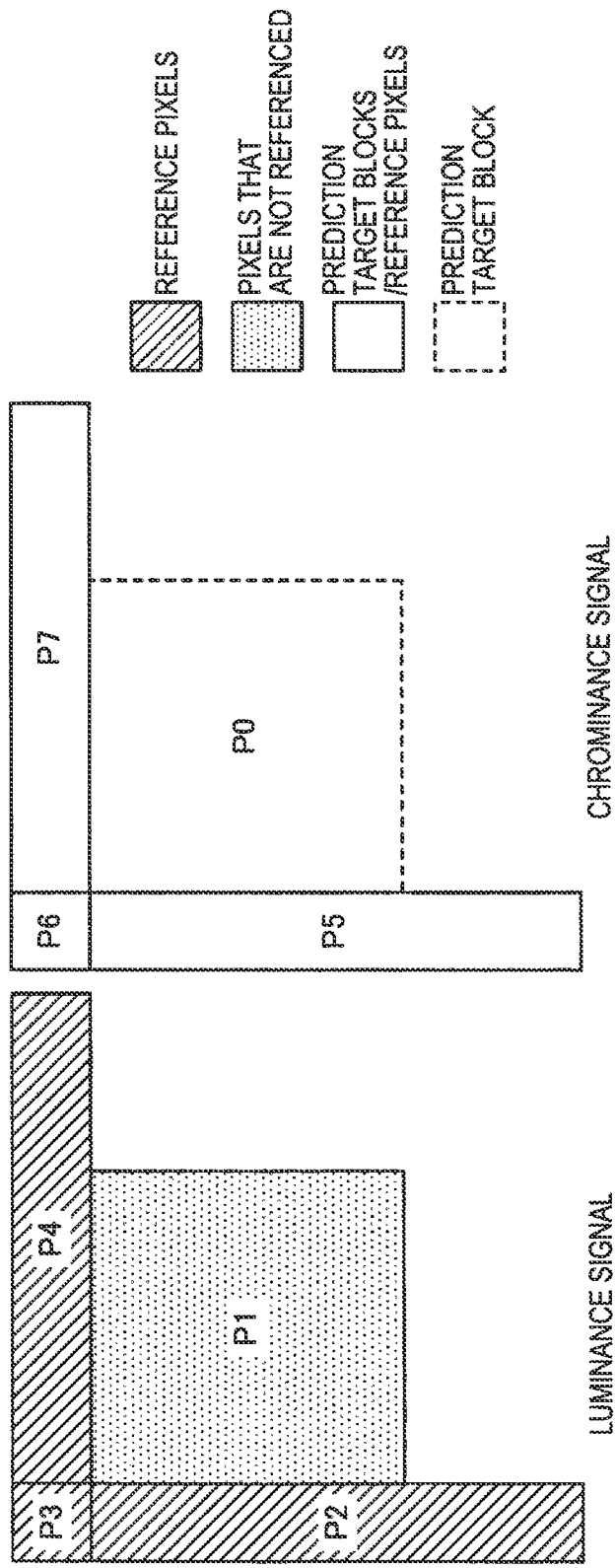
FIG. 6 is a diagram for describing the operations of the video encoding apparatus and the video decoding apparatus according to the first embodiment of the present invention.

FIG. 6 shows reference pixels that are necessary for performing luminance/chrominance prediction based on linear prediction in the video encoding apparatus 1 and the video decoding apparatus 100.

In the video encoding apparatus 1, to predict a prediction target block P0 of a chrominance signal, the prediction coefficient deriving unit 2211 and the inter-channel reference pixel generation unit 2212 first perform linear prediction of prediction target blocks P5, P6, P7 (the chrominance intra-predicted reference pixels SIG43 of the block i in FIG. 3) of the chrominance signal by using intra-predicted reference pixels P2, P3, P4 (the luminance intra reference pixels SIG34 of the block i in FIG. 3) of a luminance signal. Then, the intra-predicted pixel generation unit 223 performs intra prediction of the prediction target block P0 (the chrominance intra-predicted pixels SIG24 in FIG. 3) of the chrominance signal by using the prediction target blocks P5 to P7 of the chrominance signal as reference pixels.

In the video decoding apparatus 100, to predict the prediction target block P0 of the chrominance signal, the prediction coefficient deriving unit 12811 and the inter-channel reference pixel generation unit 12812 first perform linear prediction of the prediction target blocks P5, P6, P7 (the chrominance intra-predicted reference pixels SIG133 in FIG. 5) of the chrominance signal by using the intra-predicted reference pixels P2, P3, P4 (the luminance intra reference pixels SIG104 of the block i in FIG. 5) of the luminance signal. Then, the intra-predicted pixel generation unit 1283 performs intra prediction of the prediction target block P0 (the chrominance intra-predicted pixels SIG124 in FIG. 5) of the chrominance signal by using the prediction target blocks P5 to P7 of the chrominance signal as reference pixels.

Therefore, the video encoding apparatus 1 and the video decoding apparatus 100 do not need a reference block P1 of the luminance signal to predict the prediction target block P0 of the chrominance signal in luminance/chrominance prediction based on linear prediction. For this reason, prediction of the chrominance block m does not require local decoding (reconstruction) of the luminance block m to be completed.

The foregoing video encoding apparatus 1 can achieve the following advantageous effects.

In the video encoding apparatus 1, the prediction coefficient deriving unit 2211 and the inter-channel reference pixel generation unit 2212 perform linear prediction of the reference pixels P5 to P7 of a chrominance component by using the reference pixels P2 to P4 that are used in intra prediction for a luminance component. The intra-predicted pixel generation unit 223 performs intra prediction of the prediction target block P0 of the chrominance component by using the reference pixels P5 to P7 of the chrominance component that have been obtained through linear prediction performed by the prediction coefficient deriving unit 2211 and the inter-channel reference pixel generation unit 2212. Therefore, the reference block P1 of the luminance signal is not necessary in performing intra prediction based on linear prediction with respect to the prediction target block P0 of the chrominance component. For this reason, in performing intra prediction based on linear prediction with respect to the prediction target block P0 of the chrominance component, local decoding (reconstruction) of the reference block P1 of the luminance signal need not be completed. As a result, the restraints of processing timings in linear prediction can be reduced.

Furthermore, in the video encoding apparatus 1, the intra reference pixel generation unit 121 executes reference possibility verification processing for confirming the local-decoded state of pixels corresponding to reference pixel positions, padding processing for generating reference pixels from positions different from the reference pixel positions when reference has been determined to be impossible in the reference possibility verification processing, and smoothing processing with respect to the reference pixels. Therefore, intra reference pixels can be generated.

Furthermore, in the video encoding apparatus 1, the prediction coefficient deriving unit 2211 derives the prediction coefficient using reference pixels of a prediction target color component and reference pixels of a color component other than the prediction target color component among a plurality of color components. Therefore, the prediction coefficient can be obtained.

The foregoing video decoding apparatus 100 can achieve the following advantageous effects.

In the video decoding apparatus 100, the prediction coefficient deriving unit 12811 and the inter-channel reference pixel generation unit 12812 perform linear prediction of the reference pixels P5 to P7 of the chrominance component by using the reference pixels P2 to P4 that are used in intra prediction for the luminance component. The intra-predicted pixel generation unit 1283 performs intra prediction of the prediction target block P0 of the chrominance component by using the reference pixels P5 to P7 of the chrominance component that have been obtained through linear prediction performed by the prediction coefficient deriving unit 12811 and the inter-channel reference pixel generation unit 12812. Therefore, the reference block P1 of the luminance signal is not necessary in performing intra prediction based on linear prediction with respect to the prediction target block P0 of the chrominance component. For this reason, in performing intra prediction based on linear prediction with respect to the prediction target block P0 of the chrominance component, local decoding (reconstruction) of the reference block P1 of the luminance signal need not be completed. As a result, the restraints of processing timings in intra prediction based on linear prediction can be reduced.

Furthermore, in the video decoding apparatus 100, the intra reference pixel generation unit 1121 executes reference possibility verification processing for confirming the local-decoded state of pixels corresponding to reference pixel positions, padding processing for generating reference pixels from positions different from the reference pixel positions when reference has been determined to be impossible in the reference possibility verification processing, and smoothing processing with respect to the reference pixels. Therefore, intra reference pixels can be generated.

Furthermore, in the video decoding apparatus 100, the prediction coefficient deriving unit 12811 derives the prediction coefficient using reference pixels of a prediction target color component and reference pixels of a color component other than the prediction target color component among a plurality of color components. Therefore, the prediction coefficient can be obtained.

Second Embodiment

[Configuration and Operations of Video Encoding Apparatus 1A]

Figure 7:
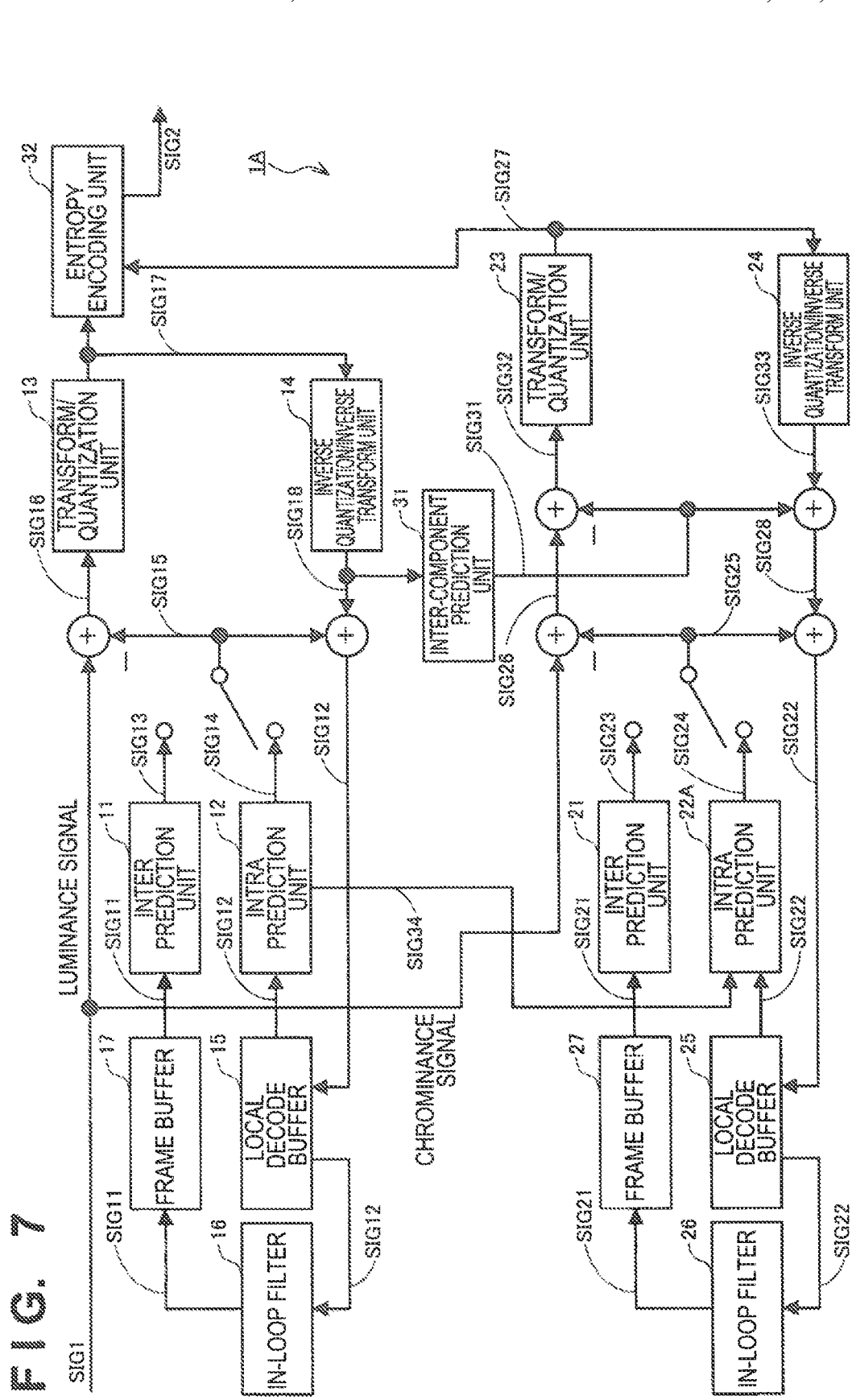
FIG. 7 is a block diagram of a video encoding apparatus according to a second embodiment of the present invention.

FIG. 7 is a block diagram of a video encoding apparatus 1A according to a second embodiment of the present invention. The video encoding apparatus 1A differs from the video encoding apparatus 1 according to the first embodiment of the present invention shown in FIG. 2 in including an intra prediction unit 22A in place of the intra prediction unit 22. Note that constituents of the video encoding apparatus 1A that are the same as constituents of the video encoding apparatus 1 will be given the same reference signs thereas, and a description thereof will be omitted.

Figure 8:
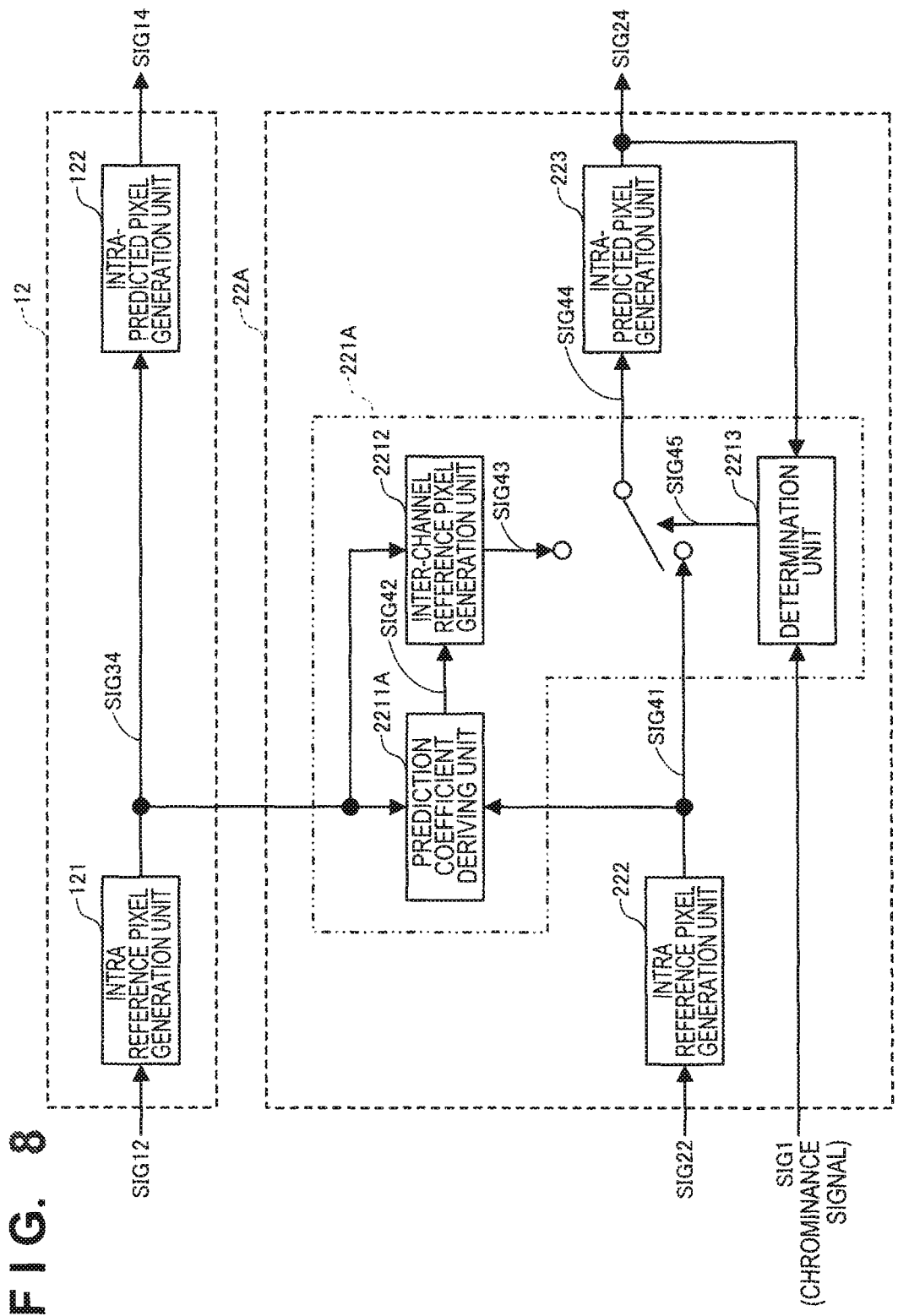
FIG. 8 is a block diagram of intra prediction units according to the second embodiment of the present invention.

FIG. 8 is a block diagram of intra prediction units 12, 22A. The intra prediction unit 22A includes an inter-channel prediction unit 221A, an intra reference pixel generation unit 222, and an intra-predicted pixel generation unit 223. The inter-channel prediction unit 221A includes a prediction coefficient deriving unit 2211A, an inter-channel reference pixel generation unit 2212, and a determination unit 2213.

The prediction coefficient deriving unit 2211A receives luminance intra reference pixels SIG34 of a block i and chrominance intra reference pixels SIG41 of a block j as input. The prediction coefficient deriving unit 2211A selects a prediction coefficient from among a plurality of preset prediction coefficients, and outputs the selected prediction coefficient as a prediction coefficient SIG42. The prediction coefficient deriving unit 2211A also transforms indices of the selected prediction coefficient into binary values, and sends a signal indicating the binary values as side information.

[Configuration and Operations of Video Decoding Apparatus 100A]

Figure 9:
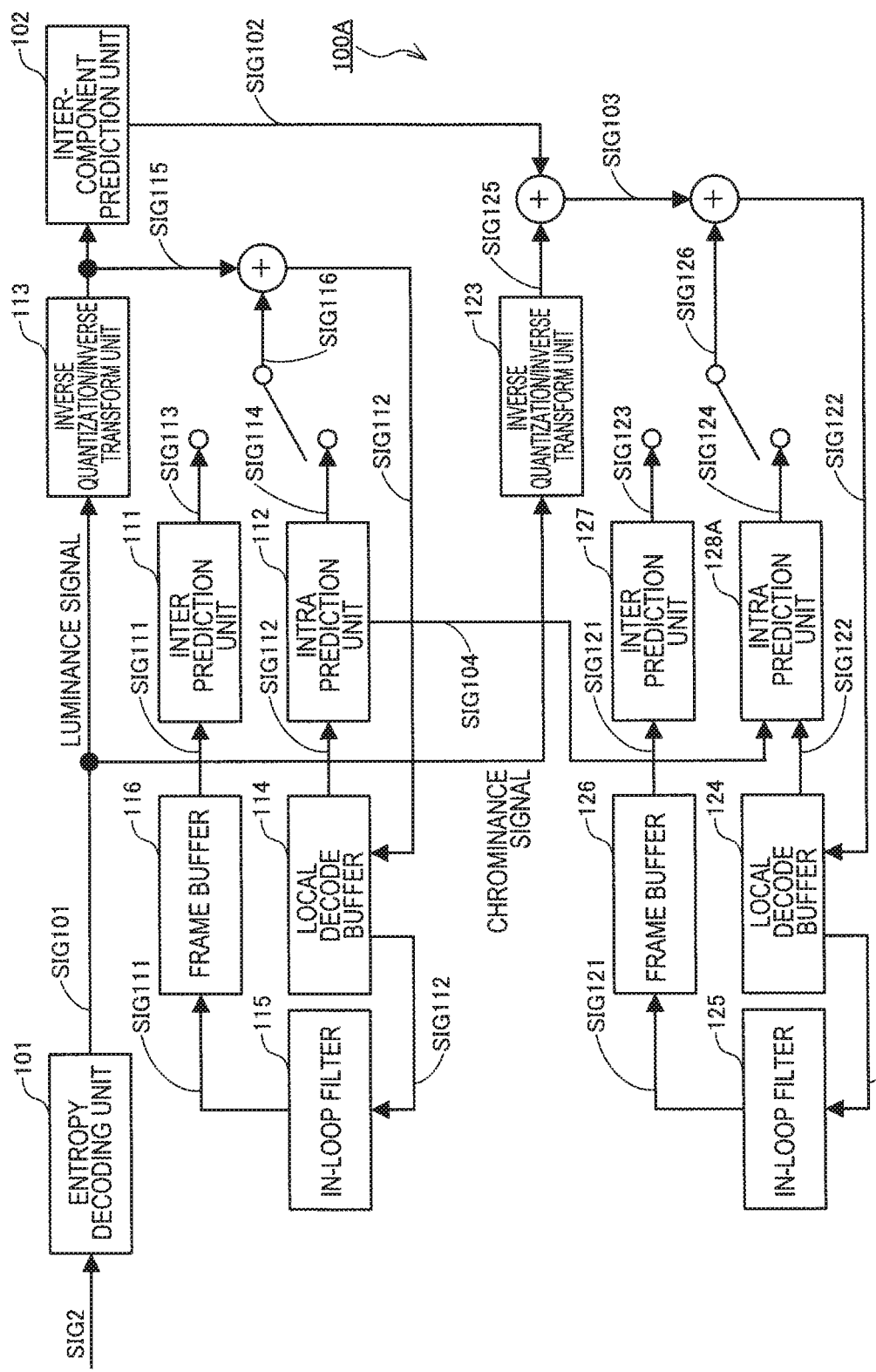
FIG. 9 is a block diagram of a video decoding apparatus according to the second embodiment of the present invention.

FIG. 9 is a block diagram of a video decoding apparatus 100A according to the second embodiment of the present invention. The video decoding apparatus 100A differs from the video decoding apparatus 100 according to the first embodiment of the present invention shown in FIG. 4 in including an intra prediction unit 128A in place of the intra prediction unit 128. Note that constituents of the video decoding apparatus 100A that are the same as constituents of the video decoding apparatus 100 will be given the same reference signs thereas, and a description thereof will be omitted.

Figure 10:
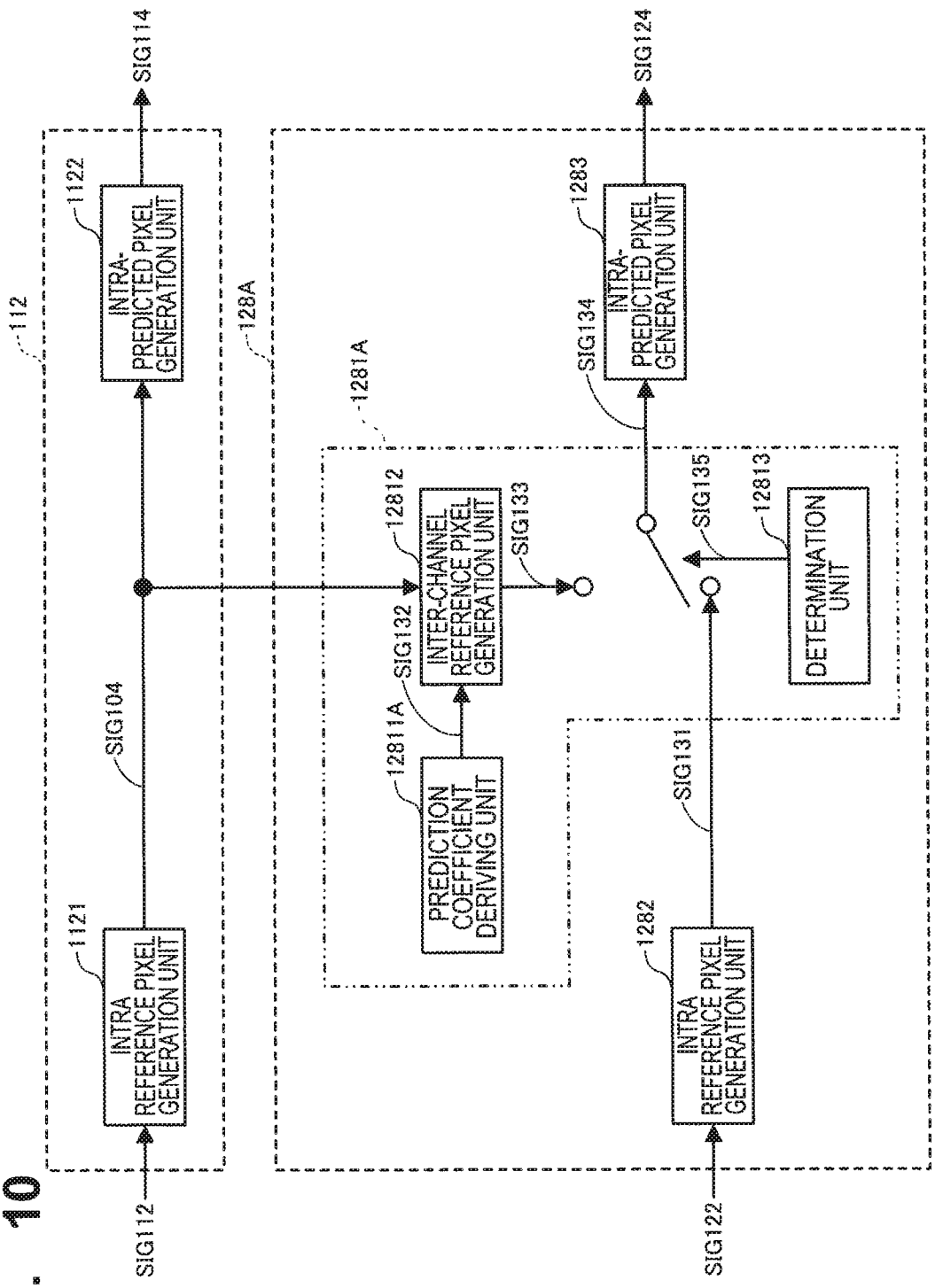
FIG. 10 is a block diagram of intra prediction units according to the second embodiment of the present invention.

FIG. 10 is a block diagram of intra prediction units 112, 128A. The intra prediction unit 128A includes an inter-channel prediction unit 1281A, an intra reference pixel generation unit 1282, and an intra-predicted pixel generation unit 1283. The inter-channel prediction unit 1281A includes a prediction coefficient deriving unit 12811A and an inter-channel reference pixel generation unit 12812.

The prediction coefficient deriving unit 12811A receives a non-illustrated prediction coefficient signal as input. The prediction coefficient deriving unit 12811A selects a prediction coefficient designated by the input prediction coefficient signal from among a plurality of preset prediction coefficients, and outputs the selected prediction coefficient as a prediction coefficient SIG132. Note that the foregoing prediction coefficient signal denotes the side information indicated by the signal from the prediction coefficient deriving unit 2211A of the video encoding apparatus 1A.

The foregoing video encoding apparatus 1A can achieve the following advantageous effect in addition to the aforementioned advantageous effects achieved by the video encoding apparatus 1.

In the video encoding apparatus 1A, the prediction coefficient deriving unit 2211A selects a prediction coefficient from among a plurality of preset prediction coefficients. Therefore, the prediction coefficient can be obtained.

The foregoing video decoding apparatus 100A can achieve the following advantageous effect in addition to the aforementioned advantageous effects achieved by the video decoding apparatus 100.

In the video decoding apparatus 100A, the prediction coefficient deriving unit 12811A selects a prediction coefficient corresponding to a signal from the video encoding apparatus 1A from among a plurality of preset prediction coefficients. Therefore, the prediction coefficient can be obtained.

Third Embodiment

[Configuration and Operations of Video Encoding Apparatus 1B]

Figure 11:
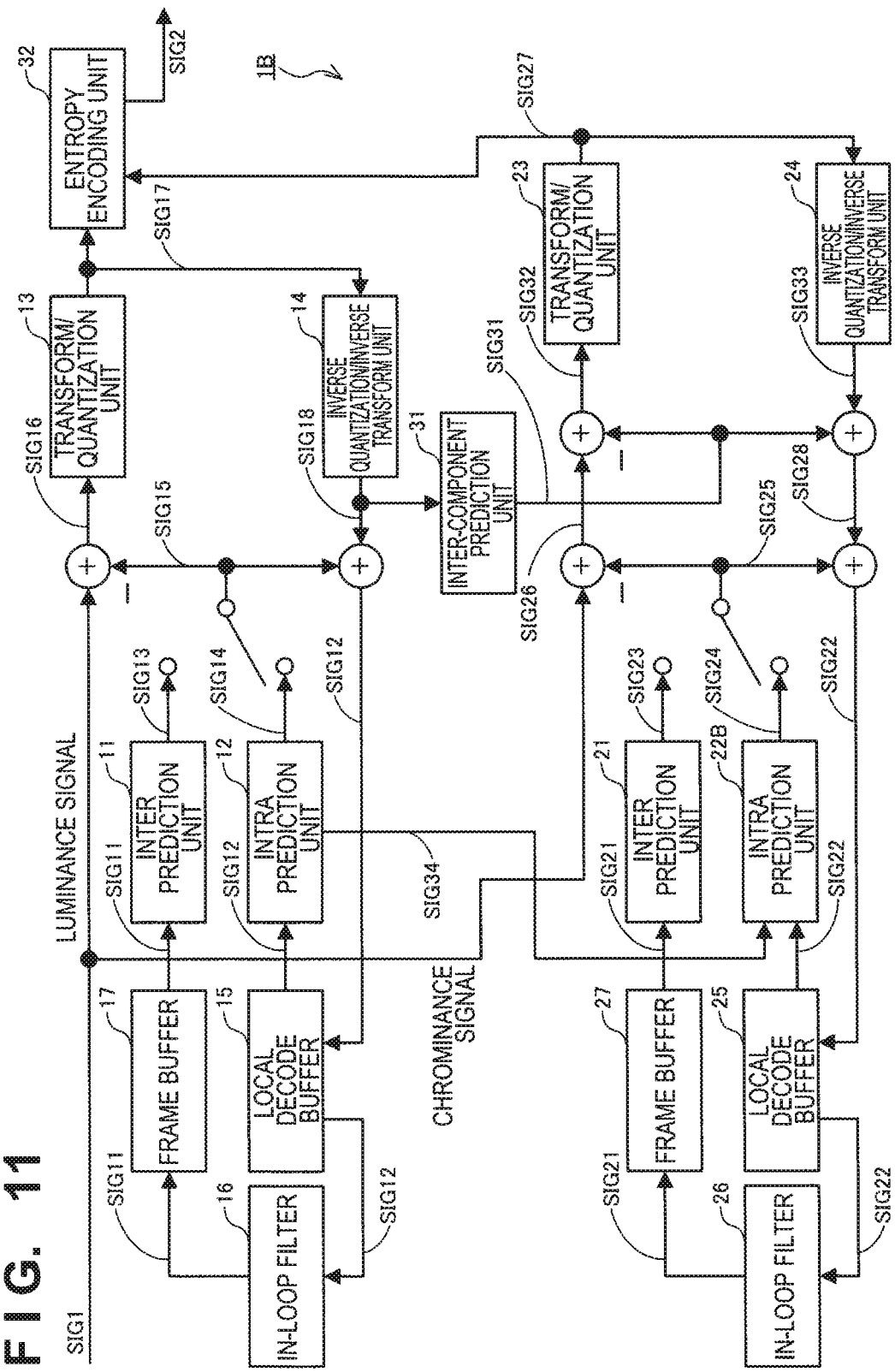
FIG. 11 is a block diagram of a video encoding apparatus according to a third embodiment of the present invention.

FIG. 11 is a block diagram of a video encoding apparatus 1B according to a third embodiment of the present invention. The video encoding apparatus 1B differs from the video encoding apparatus 1 according to the first embodiment of the present invention shown in FIG. 2 in including an intra prediction unit 22B in place of the intra prediction unit 22. Note that constituents of the video encoding apparatus 1B that are the same as constituents of the video encoding apparatus 1 will be given the same reference signs thereas, and a description thereof will be omitted.

Figure 12:
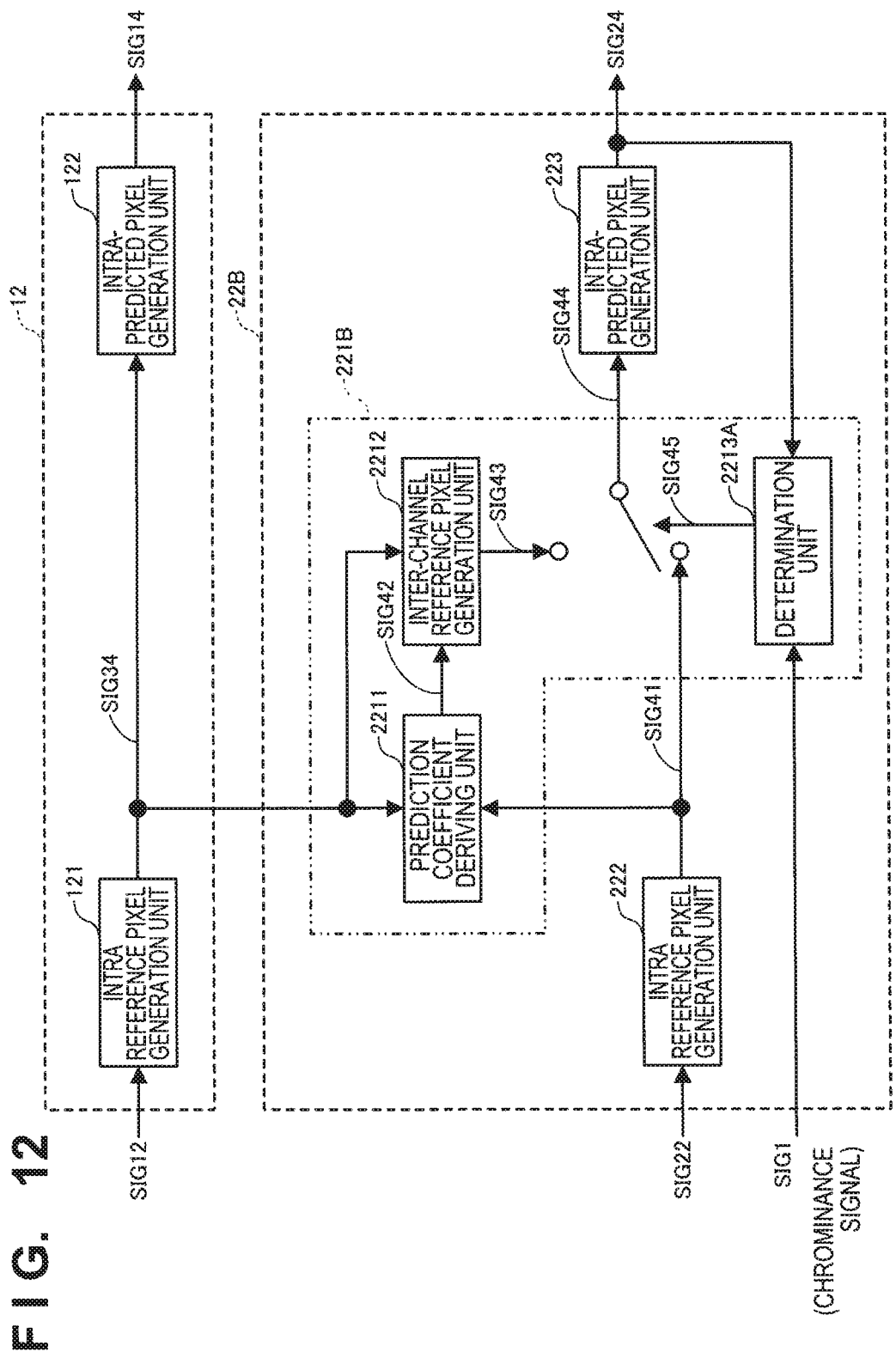
FIG. 12 is a block diagram of intra prediction units according to the third embodiment of the present invention.

FIG. 12 is a block diagram of intra prediction units 12, 22B. The intra prediction unit 22B includes an inter-channel prediction unit 221B, an intra reference pixel generation unit 222, and an intra-predicted pixel generation unit 223. The inter-channel prediction unit 221B includes a prediction coefficient deriving unit 2211, an inter-channel reference pixel generation unit 2212, and a determination unit 2213A.

The determination unit 2213A receives a chrominance signal of an input image SIG1 and chrominance intra-predicted pixels SIG24 as input. The determination unit 2213A generates a control signal SIG45 based on the chrominance signal of the input image SIG1 and the chrominance intra-predicted pixels SIG24 so as to select chrominance intra reference pixels SIG41 or chrominance intra-predicted reference pixels SIG43 as chrominance intra reference pixels SIG44 to be fed to the intra-predicted pixel generation unit 223. The determination unit 2213A also determines whether linear prediction is to be performed by a prediction coefficient deriving unit 12811 and an inter-channel reference pixel generation unit 12812 of a video decoding apparatus 100B (see later-described FIG. 14) based on the chrominance signal of the input image SIG1 and the chrominance intra-predicted pixels SIG24, and sends a signal indicating the result of determination as one of chrominance intra prediction modes. Accordingly, the number of the chrominance intra prediction mode is added.

Furthermore, when the determination unit 2213A has determined that linear prediction is to be performed, it makes an arrangement so that a chrominance intra prediction mode is the same as a luminance intra prediction mode.

[Configuration and Operations of Video Decoding Apparatus 100B]

Figure 13:
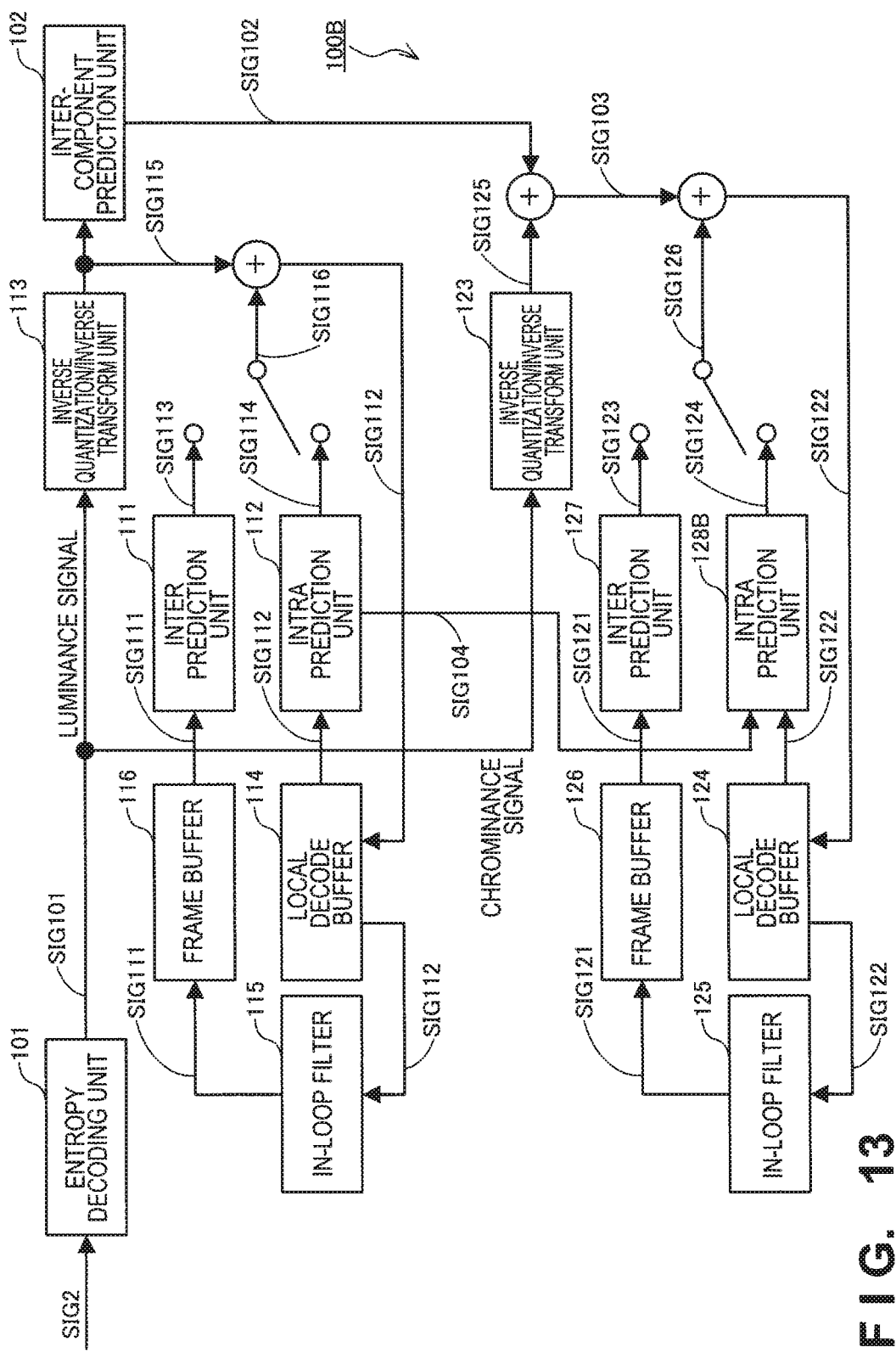
FIG. 13 is a block diagram of a video decoding apparatus according to the third embodiment of the present invention.

FIG. 13 is a block diagram of the video decoding apparatus 100B according to the third embodiment of the present invention. The video decoding apparatus 100B differs from the video decoding apparatus 100 according to the first embodiment of the present invention shown in FIG. 4 in including an intra prediction unit 128B in place of the intra prediction unit 128. Note that constituents of the video decoding apparatus 100B that are the same as constituents of the video decoding apparatus 100 will be given the same reference signs thereas, and a description thereof will be omitted.

Figure 14:
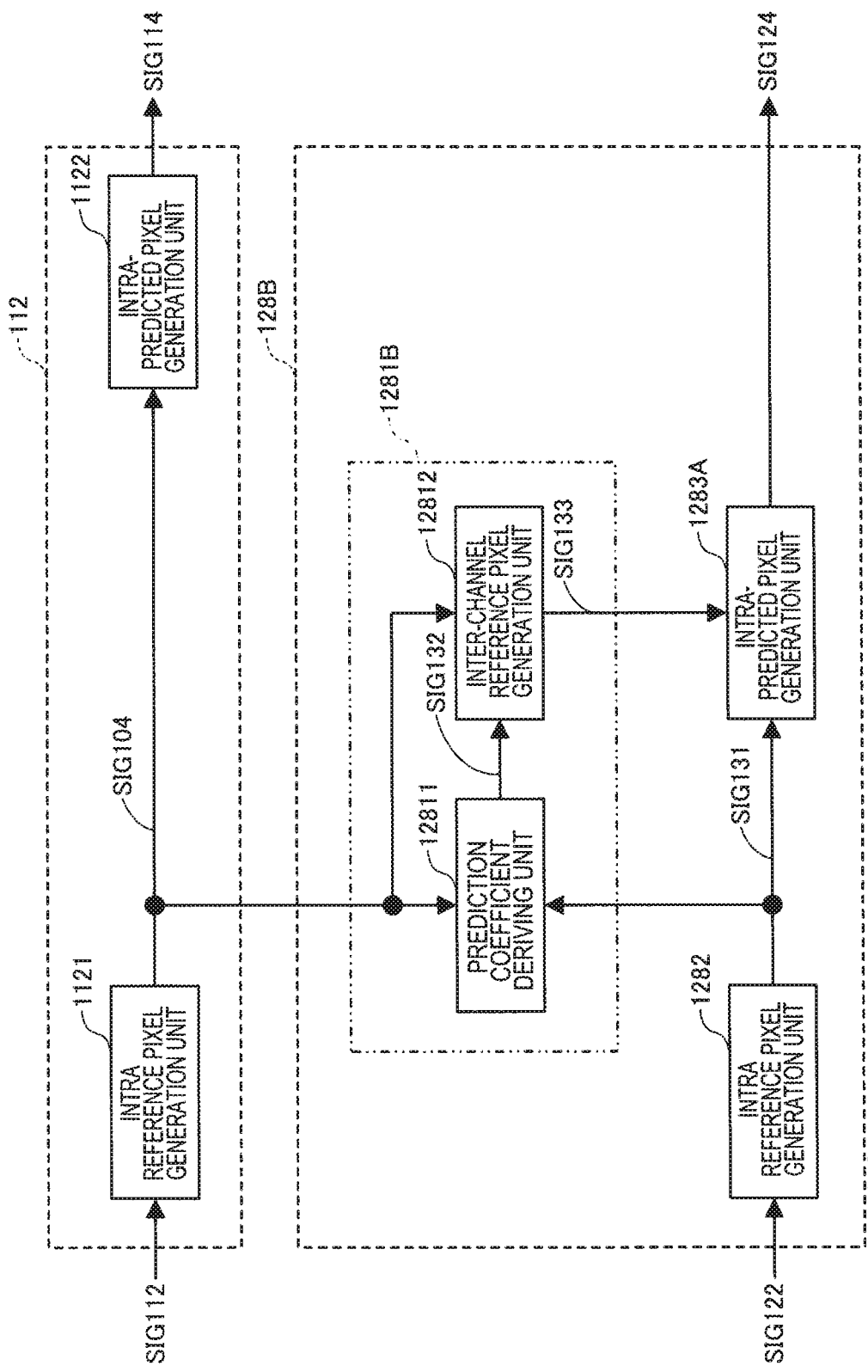
FIG. 14 is a block diagram of intra prediction units according to the third embodiment of the present invention.

FIG. 14 is a block diagram of intra prediction units 112, 128B. The intra prediction unit 128B includes an inter-channel prediction unit 1281B, an intra reference pixel generation unit 1282, and an intra-predicted pixel generation unit 1283A. The inter-channel prediction unit 1281B includes a prediction coefficient deriving unit 12811 and an inter-channel reference pixel generation unit 12812.

The intra-predicted pixel generation unit 1283A receives chrominance intra reference pixels SIG131, chrominance intra-predicted reference pixels SIG133, and a non-illustrated prediction mode signal as input. When the input prediction mode signal indicates that the chrominance intra-predicted reference pixels SIG133 are to be used, the intra-predicted pixel generation unit 1283A generates chrominance intra-predicted pixels SIG124 using the chrominance intra-predicted reference pixels SIG133, and outputs the generated pixels. On the other hand, when the input prediction mode signal indicates that the chrominance intra reference pixels SIG131 are to be used, the intra-predicted pixel generation unit 1283A generates the chrominance intra-predicted pixels SIG124 using the chrominance intra reference pixels SIG131, and outputs the generated pixels. Note that the foregoing input prediction mode signal is the chrominance intra prediction mode indicated by the signal from the determination unit 2213A of the video encoding apparatus 1B.

When the input prediction mode signal indicates that the chrominance intra-predicted reference pixels SIG133 are to be used, the intra-predicted pixel generation unit 1283A makes an arrangement so that a chrominance intra prediction mode is the same as a luminance intra prediction mode.

The foregoing video encoding apparatus 1B can achieve the following advantageous effect in addition to the aforementioned advantageous effects achieved by the video encoding apparatus 1.

In the video encoding apparatus 1B, the determination unit 2213A determines whether linear prediction of a prediction target block is to be performed in the video decoding apparatus 100B, and sends a signal indicating the result of determination as one of chrominance intra prediction modes to the video decoding apparatus 100B. When the determination unit 2213A has determined that linear prediction of the prediction target block is to be performed in the video decoding apparatus 100B, it makes an arrangement so that a prediction mode for a prediction target color component is the same as a prediction mode for the prediction target color component among a plurality of color components. Therefore, whether linear prediction of the prediction target block is to be performed in the video decoding apparatus 100B can be communicated as one of chrominance intra prediction modes to the video decoding apparatus 100B.

The foregoing video decoding apparatus 100B can achieve the following advantageous effect in addition to the aforementioned advantageous effects achieved by the video decoding apparatus 100.

The video decoding apparatus 100B can perform linear prediction in accordance with a signal from the video encoding apparatus 1B.

Fourth Embodiment

[Configuration and Operations of Video Encoding Apparatus 1C]

Figure 15:
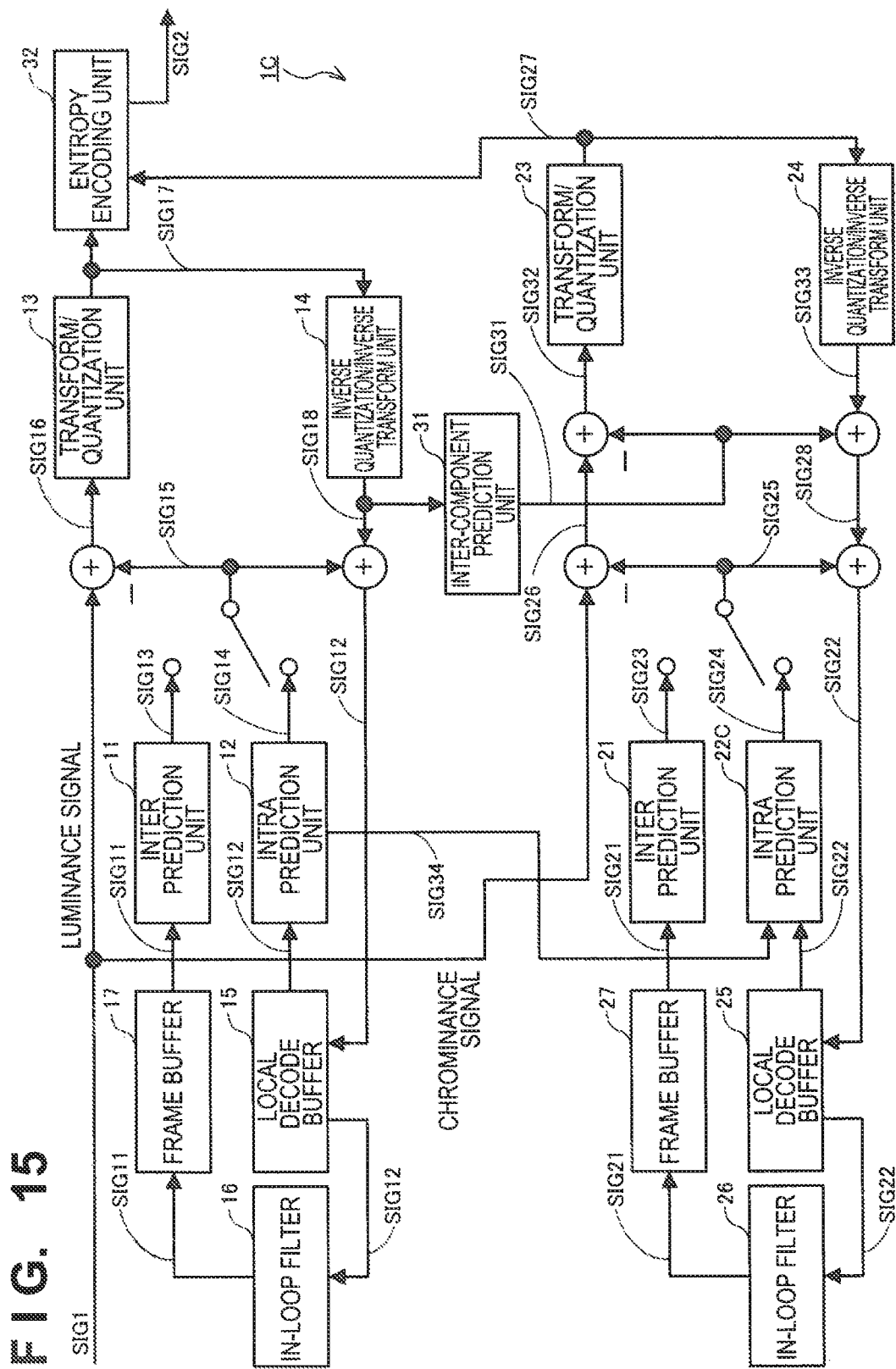
FIG. 15 is a block diagram of a video encoding apparatus according to a fourth embodiment of the present invention.

FIG. 15 is a block diagram of a video encoding apparatus 1C according to a fourth embodiment of the present invention. The video encoding apparatus 1C differs from the video encoding apparatus 1 according to the first embodiment of the present invention shown in FIG. 2 in including an intra prediction unit 22C in place of the intra prediction unit 22. Note that constituents of the video encoding apparatus 1C that are the same as constituents of the video encoding apparatus 1 will be given the same reference signs thereas, and a description thereof will be omitted.

Figure 16:
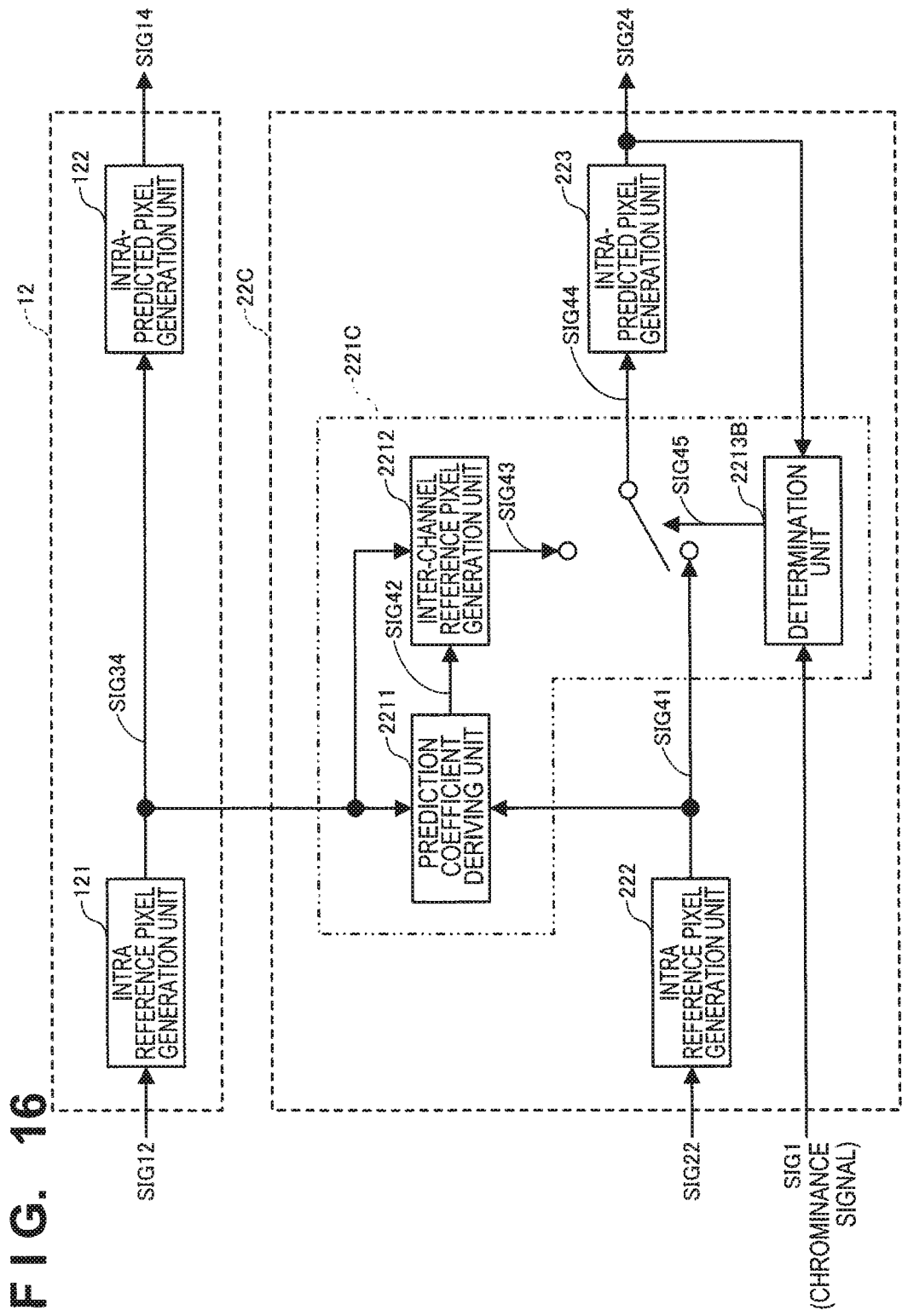
FIG. 16 is a block diagram of intra prediction units according to the fourth embodiment of the present invention.

FIG. 16 is a block diagram of intra prediction units 12, 22C. The intra prediction unit 22C includes an inter-channel prediction unit 221C, an intra reference pixel generation unit 222, and an intra-predicted pixel generation unit 223. The inter-channel prediction unit 221C includes a prediction coefficient deriving unit 2211, an inter-channel reference pixel generation unit 2212, and a determination unit 2213B.

The determination unit 2213B receives a chrominance signal of an input image SIG1 and chrominance intra-predicted pixels SIG24 as input. The determination unit 2213B generates a control signal SIG45 based on the chrominance signal of the input image SIG1 and the chrominance intra-predicted pixels SIG24 so as to select chrominance intra reference pixels SIG41 or chrominance intra-predicted reference pixels SIG43 as chrominance intra reference pixels SIG44 to be fed to the intra-predicted pixel generation unit 223. Only when a chrominance intra prediction mode that is the same as a luminance intra prediction mode is used among chrominance intra prediction modes, the determination unit 2213B determines whether linear prediction is to be performed by a prediction coefficient deriving unit 12811 and an inter-channel reference pixel generation unit 12812 of a video decoding apparatus 100C (see later-described FIG. 18) based on the chrominance signal of the input image SIG1 and the chrominance intra-predicted pixels SIG24, and sends a signal indicating the result of determination. This signaling can be performed using, for example, a flag indicated by a single-digit binary value.

[Configuration and Operations of Video Decoding Apparatus 100C]

Figure 17:
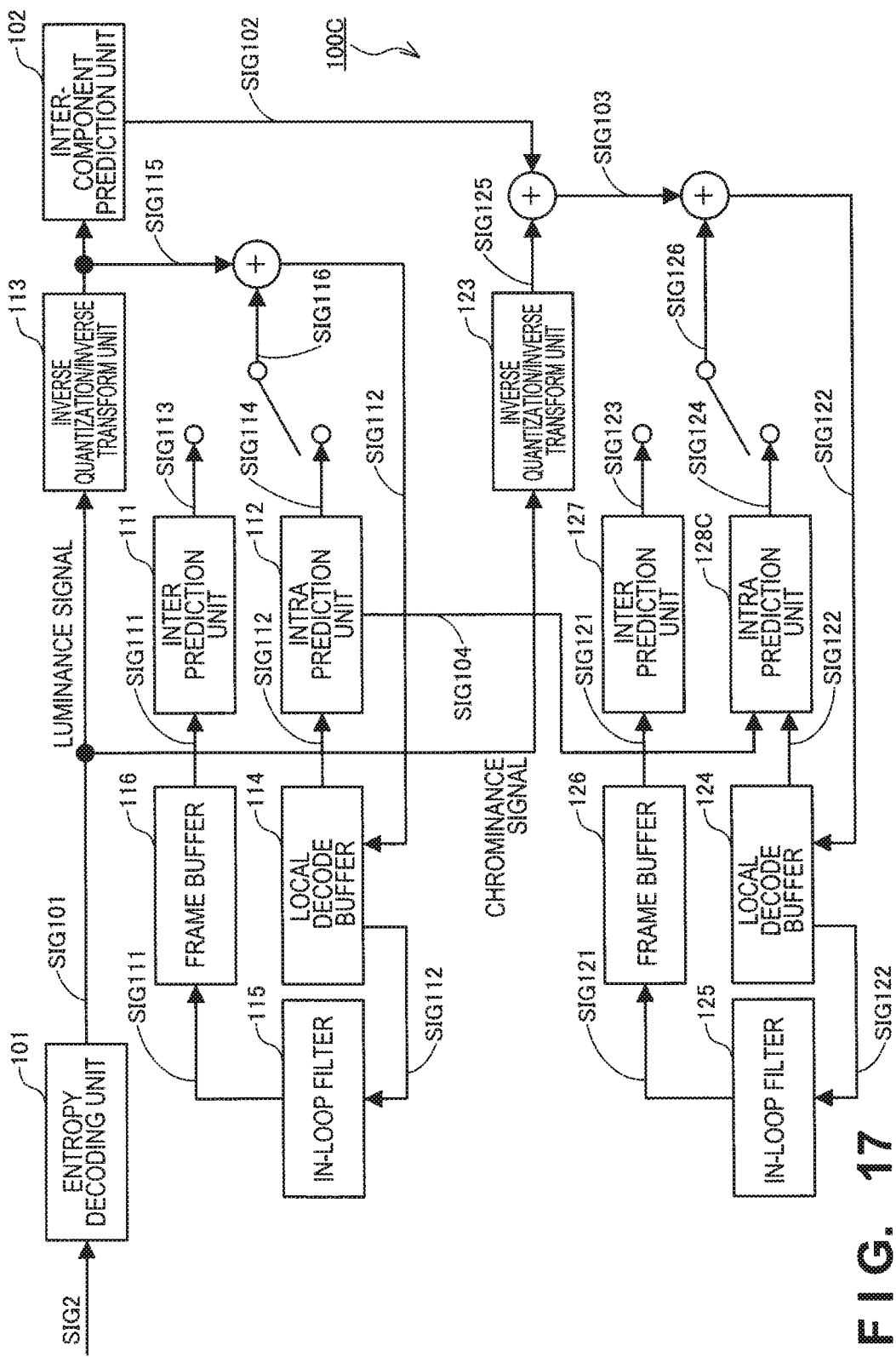
FIG. 17 is a block diagram of a video decoding apparatus according to the fourth embodiment of the present invention.

FIG. 17 is a block diagram of the video decoding apparatus 100C according to the fourth embodiment of the present invention. The video decoding apparatus 100C differs from the video decoding apparatus 100 according to the first embodiment of the present invention shown in FIG. 4 in including an intra prediction unit 128C in place of the intra prediction unit 128. Note that constituents of the video decoding apparatus 100C that are the same as constituents of the video decoding apparatus 100 will be given the same reference signs thereas, and a description thereof will be omitted.

Figure 18:
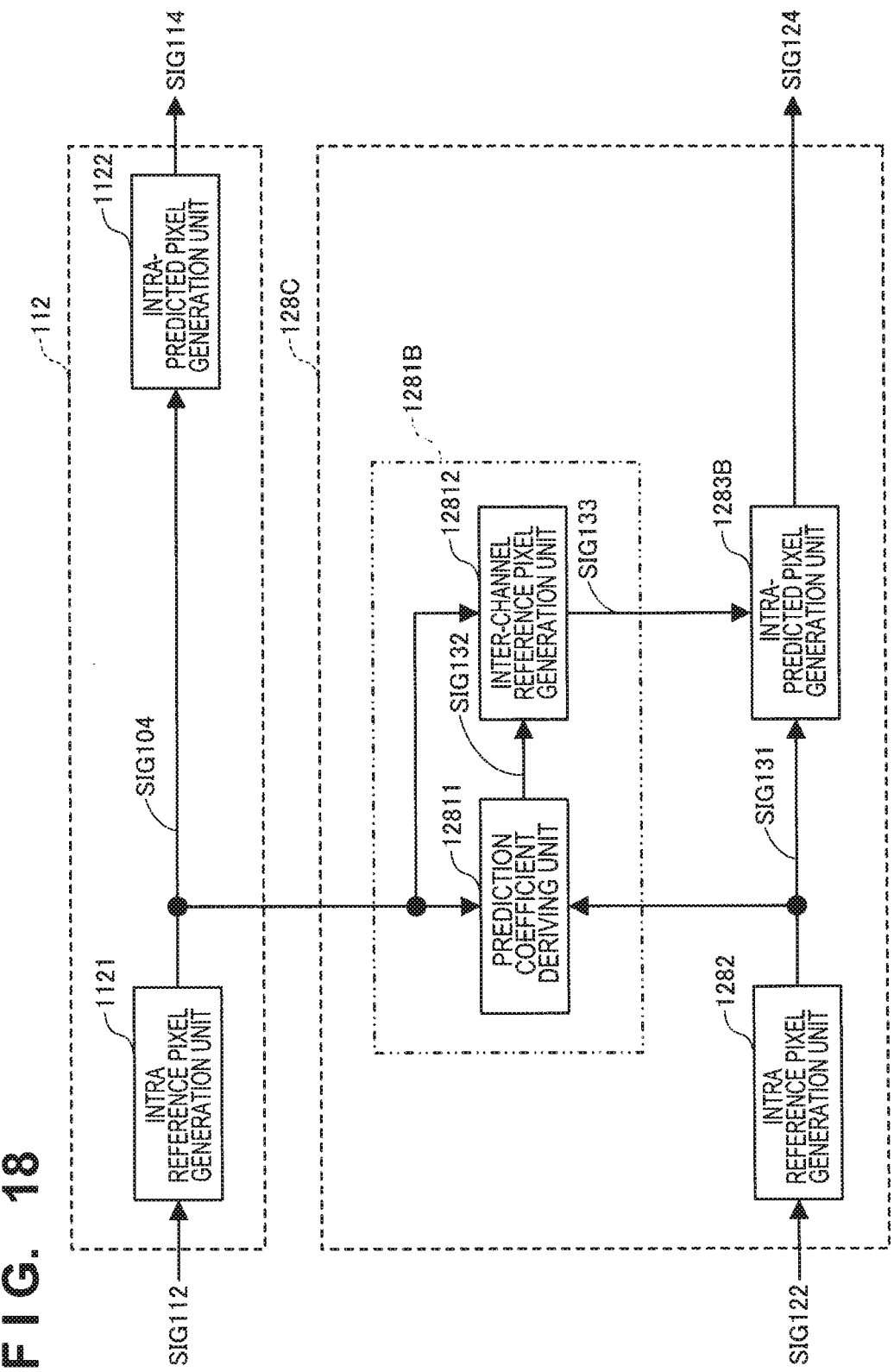
FIG. 18 is a block diagram of intra prediction units according to the fourth embodiment of the present invention.

FIG. 18 is a block diagram of intra prediction units 112, 128C. The intra prediction unit 128C includes an inter-channel prediction unit 1281B, an intra reference pixel generation unit 1282, and an intra-predicted pixel generation unit 1283B. The inter-channel prediction unit 1281B includes a prediction coefficient deriving unit 12811 and an inter-channel reference pixel generation unit 12812.

The intra-predicted pixel generation unit 1283B receives chrominance intra reference pixels SIG131, chrominance intra-predicted reference pixels SIG133, and a non-illustrated signal as input. When the input signal indicates that the chrominance intra-predicted reference pixels SIG133 are to be used, the intra-predicted pixel generation unit 1283B generates chrominance intra-predicted pixels SIG124 using the chrominance intra-predicted reference pixels SIG133, and outputs the generated pixels. On the other hand, when the input signal indicates that the chrominance intra reference pixels SIG131 are to be used, the intra-predicted pixel generation unit 1283B generates the chrominance intra-predicted pixels SIG124 using the chrominance intra reference pixels SIG131, and outputs the generated pixels. Note that the foregoing input signal is the signal from the determination unit 2213B of the video encoding apparatus 1C.

The foregoing video encoding apparatus 1C can achieve the following advantageous effect in addition to the aforementioned advantageous effects achieved by the video encoding apparatus 1.

In the video encoding apparatus 1C, when a prediction mode for a chrominance component is the same as a prediction mode for a luminance component, the determination unit 2213B determines whether linear prediction of a prediction target block is to be performed in the video decoding apparatus 100C, and sends a signal indicating the result of determination to the video decoding apparatus 100C. Therefore, when the prediction mode for the chrominance component is the same as the prediction mode for the luminance component, whether linear prediction of the prediction target block is to be performed in the video decoding apparatus 100C can be communicated to the video decoding apparatus 100C.

The foregoing video decoding apparatus 100C can achieve the following advantageous effect in addition to the aforementioned advantageous effects achieved by the video decoding apparatus 100.

The video decoding apparatus 100C can perform linear prediction in accordance with a signal from the video encoding apparatus 1C.

Fifth Embodiment

[Configuration and Operations of Video Encoding Apparatus 1D]

Figure 19:
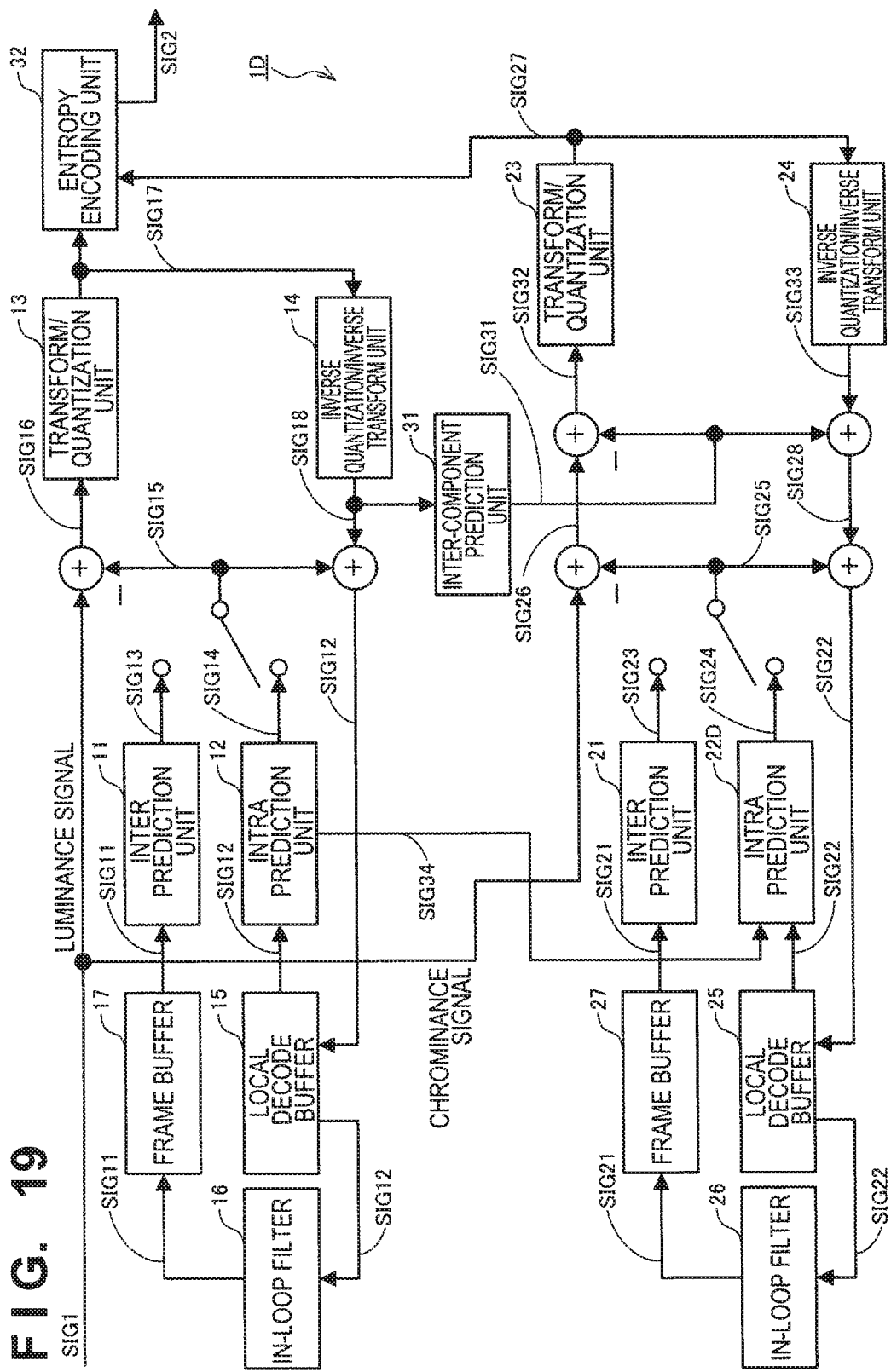
FIG. 19 is a block diagram of a video encoding apparatus according to a fifth embodiment of the present invention.

FIG. 19 is a block diagram of a video encoding apparatus 1D according to a fifth embodiment of the present invention. The video encoding apparatus 1D differs from the video encoding apparatus 1 according to the first embodiment of the present invention shown in FIG. 2 in including an intra prediction unit 22D in place of the intra prediction unit 22. Note that constituents of the video encoding apparatus 1D that are the same as constituents of the video encoding apparatus 1 will be given the same reference signs thereas, and a description thereof will be omitted.

Figure 20:
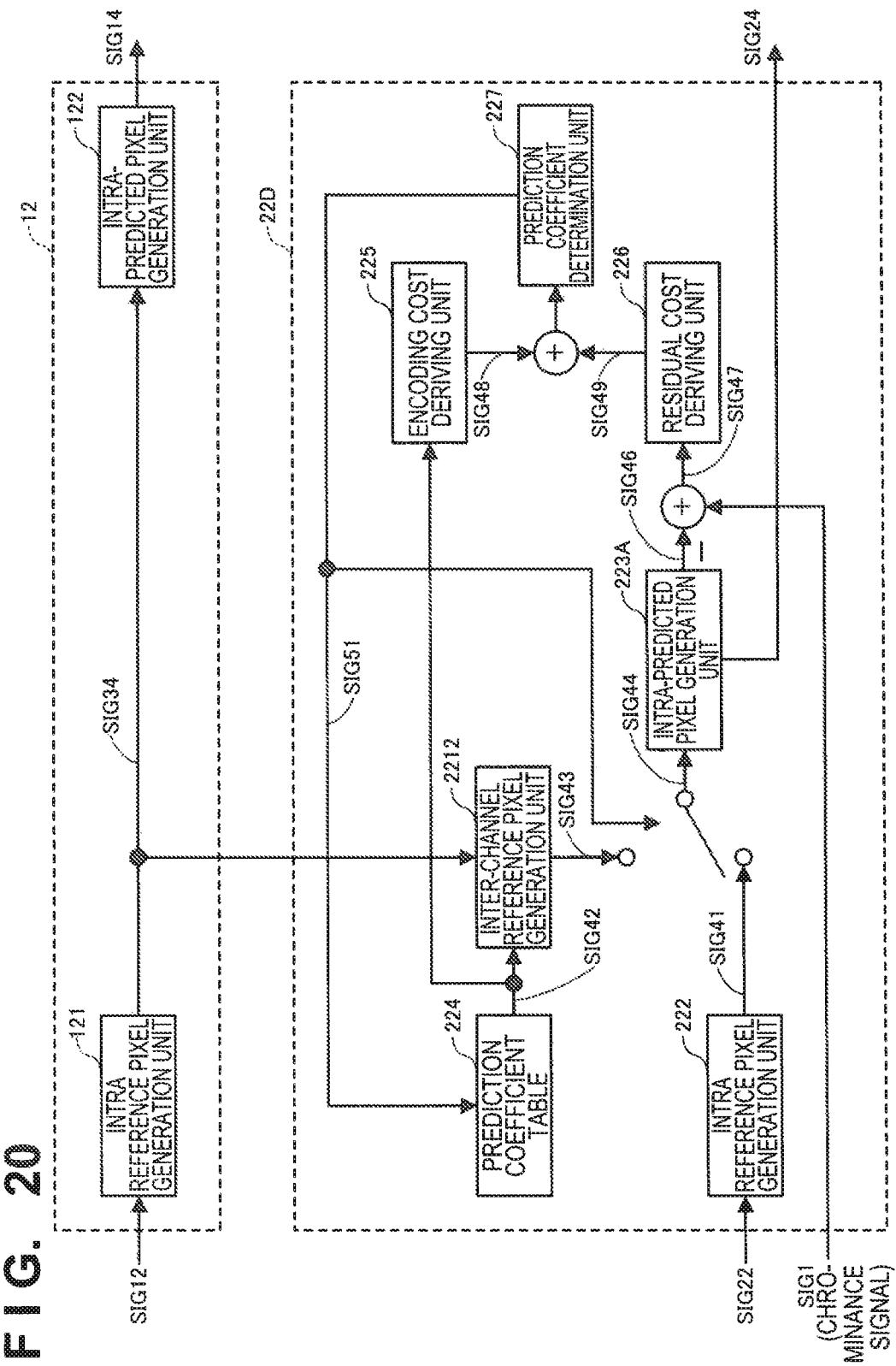
FIG. 20 is a block diagram of intra prediction units according to the fifth embodiment of the present invention.
Figure 21:
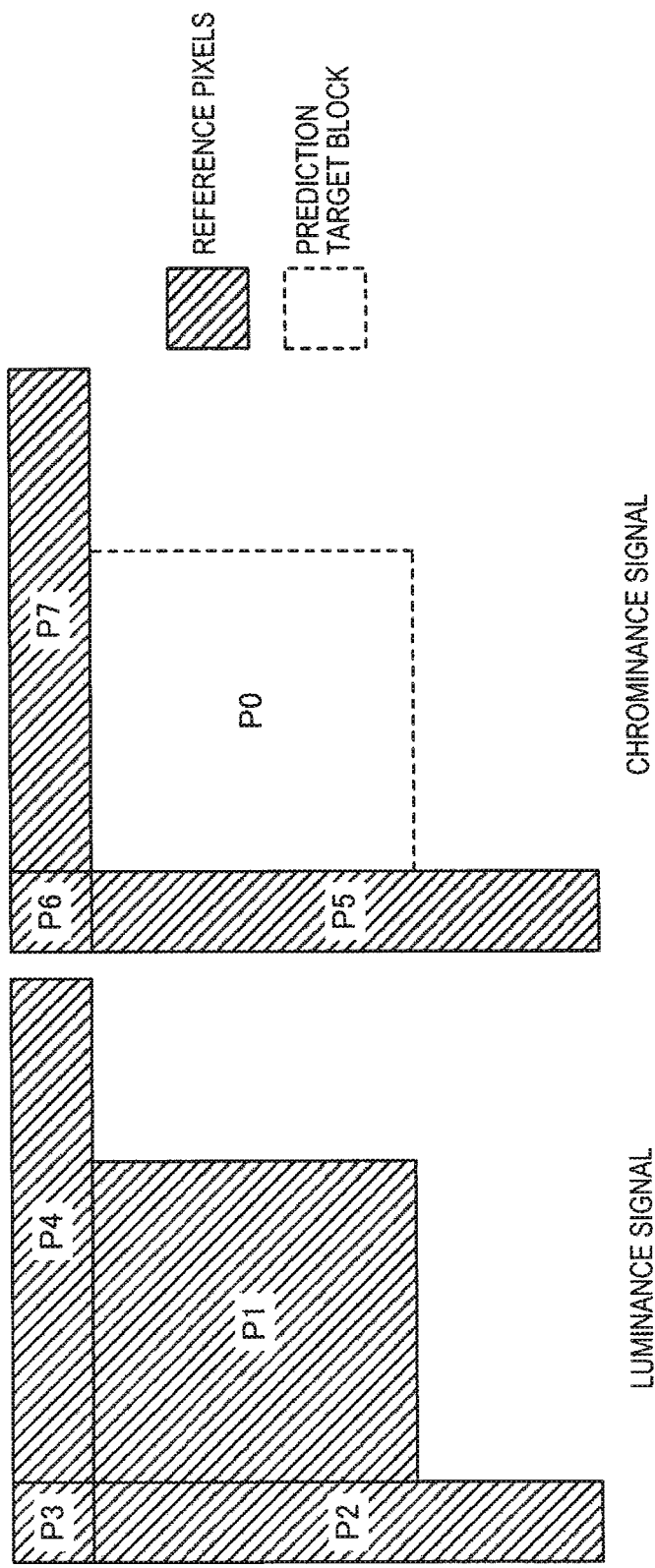
FIG. 21 is a diagram for describing the operations of video encoding apparatuses and video decoding apparatuses according to conventional examples.

FIG. 20 is a block diagram of intra prediction units 12, 22D. The intra prediction unit 22D includes an inter-channel reference pixel generation unit 2212, an intra reference pixel generation unit 222, an intra-predicted pixel generation unit 223A, a prediction coefficient table 224, an encoding cost deriving unit 225, a residual cost deriving unit 226, and a prediction coefficient determination unit 227.

The prediction coefficient table 224 receives, as input, a later-described prediction coefficient index SIG51 output from the prediction coefficient determination unit 227. The prediction coefficient table 224 stores a plurality of preset prediction coefficients, determines one of the plurality of prediction coefficients that corresponds to the prediction coefficient index SIG51, and outputs the determined prediction coefficient as a prediction coefficient SIG42.

The encoding cost deriving unit 225 receives the prediction coefficient SIG42 as input. The linear prediction for a prediction target block encoding cost deriving unit 225 derives an encoding cost SIG48, which is a product of an approximate encoding amount required in relation to the prediction coefficient SIG42 and a coefficient λ determined by a quantization parameter QP, and outputs the derived encoding cost. Note that the coefficient λ determined by the quantization parameter QP can be calculated using the following mathematical expression (11).

[Math. 11]

$$\lambda = 0.85 \times pow\left(2, \frac{QP-12}{3}\right) \quad (11)$$

The residual cost deriving unit 226 receives, as input, a difference signal SIG47 obtained from a chrominance signal of an input image SIG1 and a later-described chrominance predicted signal SIG46 output from the intra-predicted pixel generation unit 223A. For each prediction coefficient available for untransformed and unquantized prediction residual signals for luminance and chrominance with respect to an encoding target block, the residual cost deriving unit 226 derives an SAID, or a sum of absolute values, of Hadamard transform coefficients for the difference signal SIG47 as a residual cost SIG49, and outputs the derived residual cost.

The prediction coefficient determination unit 227 receives a sum of the encoding cost SIG48 and the residual cost SIG49 as input. The prediction coefficient determination unit determines an optimal prediction coefficient, which is a prediction coefficient that yields the smallest sum of the encoding cost SIG48 and the residual cost SIG49 among the plurality of prediction coefficients stored in the prediction coefficient table 224, and outputs the prediction coefficient index SIG51 indicating the determined prediction coefficient.

The intra-predicted pixel generation unit 223A receives chrominance intra reference pixels SIG44 as input. When the prediction coefficient determination unit 227 determines the optimal prediction coefficient, the intra-predicted pixel generation unit 223A generates the chrominance predicted signal SIG46 by performing, for example, horizontal, vertical, DC, planar, or directional prediction in accordance with a prediction mode using the chrominance intra reference pixels SIG44, and outputs the generated signal. After the prediction coefficient determination unit 227 has determined the optimal prediction coefficient, the intra-predicted pixel generation unit 223A generates chrominance intra-predicted pixels SIG24 by performing, for example, horizontal, vertical, DC, planar, or directional prediction in accordance with a prediction mode using the chrominance intra reference pixels SIG44, and outputs the generated pixels.

The foregoing video encoding apparatus 1D can achieve the advantageous effects similar to the aforementioned advantageous effects achieved by the video encoding apparatus 1.

Note that the present invention can be realized by recording processing of the video encoding apparatuses 1, 1A, 1B, 1C, 1D and the video decoding apparatuses 100, 100A, 100B, 100C of the present invention to a computer-readable non-transitory recording medium, and causing the video encoding apparatuses 1, 1A, 1B, 1C, 1D and the video decoding apparatuses 100, 100A, 100B, 100C to read in and execute a program recorded in this recording medium.

Examples of this recording medium include: a non-volatile memory, such as an EPROM and a flash memory; a magnetic disk, such as a hard disk; and a CD-ROM. The program recorded in this recording medium is read in and executed by processors provided in the video encoding apparatuses 1, 1A, 1B, 1C, 1D and the video decoding apparatuses 100, 100A, 100B, 100C.

The aforementioned program, once stored in storage devices and the like of the video encoding apparatuses 1, 1A, 1B, 1C, 1D and the video decoding apparatuses 100, 100A, 100B, 100C, may be transmitted from these apparatuses to another computer system via a transmission medium or transmission waves of the transmission medium. Herein, the "transmission medium" for transmitting the program refers to a medium with a function of transmitting information, and examples of such a medium include: a network (communication network), such as the Internet; and a communication line, such as a telephone line.

The aforementioned program may realize a part of the aforementioned functions. The aforementioned program may be a so-called difference file (difference program) that can realize the aforementioned functions in combination with a program that has already been recorded in the video encoding apparatuses 1, 1A, 1B, 1C, 1D and the video decoding apparatuses 100, 100A, 100B, 100C.

Although the embodiments of the present invention have been elaborated thus far with reference to the drawings, these embodiments are not intended to limit specific configurations, and other designs and the like are possible without departing from the concept of the present invention.

For example, in the above third embodiment, the prediction coefficient deriving unit 2211 (see FIG. 12) may be replaced with the prediction coefficient deriving unit 2211A according to the second embodiment (see FIG. 8), and the prediction coefficient deriving unit 12811 (see FIG. 14) may be replaced with the prediction coefficient deriving unit 12811A according to the second embodiment (see FIG. 10).

Furthermore, in the above fourth embodiment, the prediction coefficient deriving unit 2211 (see FIG. 16) may be replaced with the prediction coefficient deriving unit 2211A according to the second embodiment (see FIG. 8), and the prediction coefficient deriving unit 12811 (see FIG. 18) may be replaced with the prediction coefficient deriving unit 12811A according to the second embodiment (see FIG. 10).

What is claimed is:
1. A video encoding apparatus that encodes a video having a plurality of color components, the video encoding apparatus comprising:
 a processor; and
 a memory including a program,
 wherein the program, when executed by the processor, causes the processor to execute:
  deriving a prediction coefficient based on first reference pixels of a luminance component of the plurality of color components and second reference pixels of a chrominance component of the plurality of color components, wherein the second reference pixels are included in a block different from a prediction target block, and the first reference pixels are included in a block corresponding to the block including the second reference pixels;

generating third reference pixels of the chrominance component based on the prediction coefficient and the first reference pixels using a predetermined equation; and performing intra prediction of the prediction target block of the chrominance component using the third reference pixels as chrominance intra reference pixels of the intra prediction, wherein the second reference pixels are left of the prediction target block, left of and above the prediction target block, and above the prediction target block, and the first reference pixels are corresponding pixels of the second reference pixels.

2. The video encoding apparatus according to claim 1, wherein the program further causes the processor to execute reference possibility verification processing for confirming a local-decoded state of pixels corresponding to first pixel positions, and padding processing for generating fourth reference pixels from pixel positions different from the first pixel positions, and smoothing processing of the fourth reference pixels when reference has been determined to be impossible in the reference possibility verification processing.

3. The video encoding apparatus according to claim 1, wherein the prediction coefficient is selected from among a plurality of preset prediction coefficients.

4. The video encoding apparatus according to claim 1, wherein the program further causes the processor to execute:

determining whether linear prediction of the prediction target block is to be performed in a video decoding apparatus, and sending a signal indicating a result of determination as one of chrominance intra prediction modes to the video decoding apparatus, and when determining that the linear prediction of the prediction target block is to be performed in the video decoding apparatus, making an arrangement so that a prediction mode for the chrominance component is the same as a prediction mode for the luminance component after sending the signal indicating the result of determination.

5. The video encoding apparatus according to claim 1, wherein, when a prediction mode for the chrominance component is the same as a prediction mode for the luminance component, determining whether linear prediction of the prediction target block is to be performed in a video decoding apparatus, and sending a signal indicating a result of determination to the video decoding apparatus.

6. A video decoding apparatus that decodes a video having a plurality of color components, the video decoding apparatus comprising:

a processor; and a memory including a program, wherein the program, when executed by the processor, causes the processor to execute:

deriving a prediction coefficient based on first reference pixels of a luminance component of the plurality of color components and second reference pixels of a chrominance component of the plurality of color components, wherein the second reference pixels are included in a block different from a prediction target block, and the first reference pixels are included in a block corresponding to the block including the second reference pixels;

generating third reference pixels of the chrominance component based on the prediction coefficient and the first reference pixels using a predetermined equation; and performing intra prediction of the prediction target block of the chrominance component using the third reference pixels as chrominance intra reference pixels of the intra prediction, wherein the second reference pixels are left of the prediction target block, left of and above the prediction target block, and above the prediction target block, and the first reference pixels are corresponding pixels of the second reference pixels.

7. The video decoding apparatus according to claim 6, wherein the program further causes the processor to execute:

reference possibility verification processing for confirming a local-decoded state of pixels corresponding to first pixel positions of the first reference pixels, and padding processing for generating fourth reference pixels from pixel positions different from the first pixel positions, and smoothing processing of the fourth reference pixels when reference has been determined to be impossible in the reference possibility verification processing.

8. The video decoding apparatus according to claim 6, wherein the prediction coefficient is selected from among a plurality of preset prediction coefficients.

9. The video decoding apparatus according to claim 6, wherein the program further causes the processor to execute:

determining whether to perform the linear prediction based on a signal from a video encoding apparatus, the linear prediction being one of prediction modes for the chrominance component, and when having determined that the linear prediction is to be performed, making an arrangement so that a prediction mode for the chrominance component is the same as a prediction mode for the first color component.

10. The video decoding apparatus according to claim 6, wherein when a prediction mode for the chrominance component is the same as a prediction mode for the luminance component, determining whether to perform the linear prediction based on a signal from a video encoding apparatus.

11. A video encoding method of a video encoding apparatus that encodes a video having a plurality of color components, the video encoding method comprising:

deriving a prediction coefficient based on first reference pixels of a luminance component of the plurality of color components and second reference pixels of a chrominance component of the plurality of color components, wherein the second reference pixels are included in a block different from a prediction target block, and the first reference pixels are included in a block corresponding to the block including the second reference pixels;

generating third reference pixels of the chrominance component based on the prediction coefficient and the first reference pixels using a predetermined equation; and performing intra prediction of the prediction target block of the chrominance component using the third reference pixels as chrominance intra reference pixels of the intra prediction,
wherein
the second reference pixels are left of the prediction target block, left of and above the prediction target block, and above the prediction target block, and
the first reference pixels are corresponding pixels of the second reference pixels.

12. A video decoding method of a video decoding apparatus that decodes a video having a plurality of color components, the video decoding method comprising:
deriving a prediction coefficient based on first reference pixels of a luminance component of the plurality of color components and second reference pixels of a chrominance component of the plurality of color components, wherein the second reference pixels are included in a block different from a prediction target block, and the first reference pixels are included in the block corresponding to the block including the second reference pixels;
generating third reference pixels of the chrominance component based on the prediction coefficient and the first reference pixels using a predetermined equation; and
performing intra prediction of the prediction target block of the chrominance component using the third reference pixels as chrominance intra reference pixels of the intra prediction,
wherein
the second reference pixels are left of the prediction target block, left of and above the prediction target block, and above the prediction target block, and
the first reference pixels are corresponding pixels of the second reference pixels.

13. A non-transitory computer readable storage medium including program for causing a computer to execute a video encoding method of a video encoding apparatus that encodes a video having a plurality of color components, the program causing the computer to execute:
deriving a prediction coefficient based on first reference pixels of a luminance component of the plurality of color components and second reference pixels of a chrominance component of the plurality of color components, wherein the second reference pixels are included in a block different from a prediction target block, and the first reference pixels are included in a block corresponding to the block including the second reference pixels;
generating third reference pixels of the chrominance component based on the prediction coefficient and the first reference pixels using a predetermined equation; and
performing intra prediction of the prediction target block of the chrominance component using the third reference pixels as chrominance intra reference pixels of the intra prediction,
wherein
the second reference pixels are left of the prediction target block, left of and above the prediction target block, and above the prediction target block, and
the first reference pixels are corresponding pixels of the second reference pixels.

14. A non-transitory computer readable storage medium including program for causing a computer to execute a video decoding method of a video decoding apparatus that decodes a video having a plurality of color components, the program causing the computer to execute:
deriving a prediction coefficient based on first reference pixels of a luminance component of the plurality of color components and second reference pixels of a chrominance component of the plurality of color components, wherein the second reference pixels are included in a block different from a prediction target block, and the first reference pixels are included in the block corresponding to the block including the second reference pixels;
generating third reference pixels of the chrominance component based on the prediction coefficient and the first reference pixels using a predetermined equation; and
performing intra prediction of the prediction target block of the chrominance component using the third reference pixels as chrominance intra reference pixels of the intra prediction,
wherein
the second reference pixels are left of the prediction target block, left of and above the prediction target block, and above the prediction target block, and
the first reference pixels are corresponding pixels of the second reference pixels.

* * * * *